(12) United States Patent
Lim et al.

(10) Patent No.: US 8,934,455 B2
(45) Date of Patent: Jan. 13, 2015

(54) COMMUNICATION TERMINAL AND NETWORK NODE

(75) Inventors: Chun Keong Benjamin Lim, Singapore (SG); Chan Wah Ng, Singapore (SG); Hong Cheng, Singapore (SG)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 128 days.

(21) Appl. No.: 13/885,794

(22) PCT Filed: Nov. 11, 2011

(86) PCT No.: PCT/JP2011/006314
§ 371 (c)(1),
(2), (4) Date: May 16, 2013

(87) PCT Pub. No.: WO2012/066759
PCT Pub. Date: May 24, 2012

(65) Prior Publication Data
US 2013/0230024 A1    Sep. 5, 2013

(30) Foreign Application Priority Data

Nov. 18, 2010  (JP) ................................ 2010-257639

(51) Int. Cl.
*H04W 4/00*   (2009.01)
*H04W 36/14*  (2009.01)
*H04L 12/66*  (2006.01)
*H04W 36/00*  (2009.01)
*H04M 1/00*   (2006.01)
(Continued)

(52) U.S. Cl.
CPC .......... *H04W 36/14* (2013.01); *H04W 36/0022* (2013.01); *H04W 8/082* (2013.01); *H04W 36/04* (2013.01)

USPC ......... 370/331; 370/352; 455/436; 455/552.1

(58) Field of Classification Search
None
See application file for complete search history.

(56) References Cited

U.S. PATENT DOCUMENTS 8,412,190 B1 * 4/2013 Moisanen et al. ............ 455/434
8,781,509 B2 * 7/2014 Fang et al. .................... 455/466
(Continued)

FOREIGN PATENT DOCUMENTS

WO     2009/139575 A2    11/2009

OTHER PUBLICATIONS

International Search Report for PCT/JP2011/006314 dated Dec. 13, 2011.
(Continued)

*Primary Examiner* — Clemence Han
(74) *Attorney, Agent, or Firm* — Pearne & Gordon LLP

(57) ABSTRACT

Disclosed is a technique allowing a communication terminal, even after a handover between different types of networks, to determine whether a communication that was in progress in an access network connected before the handover can be resumed or not. In order to receive an incoming CS call during a connection to a PS domain (E-UTRAN 101), a user terminal (UE 100) has to connect to a CS domain (UTRAN 102). When the UE has a LIPA (local IP address) in the PS domain, for example, the UE may not continue LIPA traffic in the CS domain after the CS call. In the present invention, a network performs buffering of LIPA traffic for certain duration, for example, and informs the UE of this condition, whereby the UE can securely determine whether the LIPA traffic is still kept after the CS call.

18 Claims, 16 Drawing Sheets

(51) Int. Cl.
*H04W 8/08* (2009.01)
*H04W 36/04* (2009.01)

(56) References Cited

U.S. PATENT DOCUMENTS

| | | | |
|---|---|---|---|
| 2007/0047491 A1* | 3/2007 | Dutta et al. | 370/331 |
| 2008/0049675 A1* | 2/2008 | Burgan et al. | 370/331 |
| 2008/0057962 A1* | 3/2008 | Long et al. | 455/436 |
| 2009/0161627 A1* | 6/2009 | Ekambaram et al. | 370/331 |
| 2009/0258671 A1 | 10/2009 | Kekki et al. | |
| 2010/0113010 A1 | 5/2010 | Tenny et al. | |
| 2010/0135206 A1 | 6/2010 | Cherian et al. | |
| 2011/0122867 A1* | 5/2011 | Hirab | 370/352 |
| 2011/0134882 A1* | 6/2011 | Aoyama et al. | 370/331 |
| 2011/0205922 A1* | 8/2011 | Yokota | 370/252 |
| 2013/0128865 A1* | 5/2013 | Wu et al. | 370/331 |
| 2014/0293961 A1* | 10/2014 | Khay-Ibbat et al. | 370/331 |

OTHER PUBLICATIONS

3GPP TS 23.272 (V10.1.0): "Circuit Switched (CS) fallback in Evolved Packet System (EPS)", Sep. 2010.
3GPP TR 23.829 (V1.3.0): "Local IP Access and Selected IP Traffic Offload", Sep. 2010.
3GPP TR 23.829 (V1.2.0): "Local IP Access and Selected IP Traffic Offload", Aug. 2010.
Samsung, Suspending EPS bearers, [online]. 3GPP TSG SA WG2 Meeting #64b adhoc and #65 S2-083482, May 12, 2008, Retrieved from the Internet: <URL:http://www.3gpp.org/ftp/tsg_sa/WG2_Arch/TSG2_65_Prague/docs/S2-083482.zip>.
Alcatel-Lucent, Correction to LIPS deactivation, [online]. 3GPP TSG SA WG2 Meeting #82 S2-105913, Nov. 15, 2010, Retrieved from the Internet: <URL:http://www.3gpp.org/ftp/tsg_sa/WG2_Arch/TSG2_82_Jacksonville/docs/S2-105913.zip>.

* cited by examiner

COMMUNICATION TERMINAL AND NETWORK NODE

TECHNICAL FIELD

The present invention relates to a communication technique in a packet switching data communication network. More particularly, the present invention relates to a packet data communication technique for a handover between different access networks.

BACKGROUND ART

The Third Generation Partnership Project (3GPP) is developing a new system called an Evolved Packet System (EPS) as a Long Term Evolution (LTE) program. The EPS can achieve improvement of spectral efficiency, shortening of latency and improvement of radio resources, for example. The LTE is the latest standard for a mobile network technique that realizes a GSM (Global System for Mobile communications)/EDGE (Enhanced Data GSM Environment) network technique and a UMTS (Universal Mobile Telecommunications System)/HSPA (High-Speed downlink/uplink Packet Access) network technique. The EPS allows a user to experience a higher data rate and a lot of applications and services at a low cost. In order to make sure a connection to the EPS, a user is required to use a LTE compliant user terminal (User Equipment (UE)).

In the EPS, there are two types of domains including a packet switched (PS) domain and a circuit switched (CS) domain. The PS domain is mainly used for data communications, and satisfies a condition for a higher data rate required by a user. On the other hand, the CS domain is mainly used for voice communications and is widely arranged over a large number of mobile operators so as to enable users to talk to each other.

As a feature of the LTE to implement a smooth shift to the PS domain system, CS fallback (CSFB) is known. This CSFB has a mechanism to allow a network to shift a UE having a CS service function from an access network where a PS domain only exists (e.g., E-UTRAN (Evolved UMTS Terrestrial Radio Access Network) to a CS-compatible access network having a function as a CS domain as well (e.g., UTRAN (UMTS Terrestrial Radio Access Network) for access to a CS service. The CSFB of the EPS allows a UE connected to a PS domain only to receive a voice service by reusing infrastructure already arranged for CS. The CSFB enables a UE to receive a voice call or originate a voice call.

Procedure by a UE or a network to implement the CSFB is described in the following Non-Patent Document 1, for example. For instance, when the network finds the arrival of an incoming CS call addressed to a UE connected to a PS domain only, the network informs the UE to switch (switchover) to a CS domain existing in the neighbor of the UE. As a result of this switchover, the UE is able to receive the incoming CS call. When the UE wants to accept the CS call, the UE connects to the CS domain designated by the network to accept the connection. On the other hand, when the UE does not want to accept the CS call, the UE informs the network to refuse the CS call.

In the case of a UE having a PS session in the PS domain, if the target access network (access network after switchover) supports a PS session as well and approves the connection of the PS session, the network can start a handover of the PS session. When the UE does not decide to return to the original network (access network before switchover) at the end of the CS call, the UE will remain in the target access network. When there is no active session, the UE enters an idle mode, and a determination is made whether the UE should return to the original access network or not in accordance with logic in the UE (e.g., reselection of a cell).

The LTE has another function of introduction of a local IP access (Local Internet Protocol Access: LIPA). The LIPA enables a communication between a UE and a device on a local network without performing a communication passing through a core network of the operator. A local gateway (LGW) is disposed in or in the vicinity of a local network such as a residential or corporate network, and functions as a packet data anchor to the residential or cooperate network. For instance, a user tries to access a device in a residential or corporate network (e.g., when the UE of the user tries to connect to a base station directly connected to a residential or corporate network to access a media server), traffic directly routed between the base station and the residential or corporate network can be as a communication by the LIPA. Thereby, this communication can realize better quality and low cost without using a core network resource of the cellular operator. The LIPA is described in the following Non-Patent Document 2, for example.

The LTE has still another function of selective IP traffic offloading (SIPTO). The SIPTO lets a cellular operator provide a packet data network gateway (PDN GW) near the location of the UE, thus enabling optimization of the traffic path of the UE. For instance, when the UE moves in the network of the cellular operator, policy in the network can detect the allocation of a nearer PDN GW to the UE on the basis of a geographical position or a logical position of the UE. The SIPTO is started by offloading the UE traffic path to a nearer PDN GW without a user's operation. The SIPTO assumes the application to a case of a residual or corporate network as well. Due to the SIPTO, the cellular operator can reduce the usage of a resource in the operator core network, and further a more direct Internet path can be provided to the UE rather than the passage through the operator core network. The SIPTO is described in Non-Patent Document 2, for example.

FIG. 1 shows an exemplary network system relating to the conventional technique and embodiments of the present invention. FIG. 1 exemplifies a system described in the 3GPP. Assume that, in this system, a UE 100 is registered with an operator so as to receive both of a PS service and a CS service. Assume further that the UE 100 exists in the range where an E-UTRAN 101 and a UTRAN 102 overlap. Assume further that the E-UTRAN 101 is a pure PS domain and the UTRAN 102 supports both of a PS domain and a CS domain. The UE 100 currently connects to the E-UTRAN 101, and is located in a user's residential or cooperate network 103. A home E-UTRAN node B (HeNB 104) provides a radio access channel of the E-UTRAN 101 to the UE 100. In order to control an access method of the UE 100 to a service provided by the cellular operator, a Mobility Management Entity (MME 105) executes an access control and authentication procedure required for the UE 100. When the UE 100 is authenticated and authorized for a service provided by the cellular operator, the MME 105 informs the HeNB 104 to provide a necessary resource (via link 106) and establishes a radio connection (i.e., a radio channel) to the UE 100.

When the UE 100 is authorized to receive a data service (e.g., web browsing) via an Evolved Packet Core (EPC) 107 of the cellular operator, the MME 105 selects an appropriate Packet Data Network Gateway (PDN GW 108) to let the UE 100 access the data service. The MME 105 selects an appropriate Serving Gateway (SGW 109) as well to let the UE 100 access the data service. The MME 105 requests the SGW 109 to set up a necessary connection (link 111) to the PDN GW 108 relating to the UE 100. The MME 105 further requests the SGW 109 to set up a necessary EPS bearer (link 112) to the HeNB 104 relating to the UE 100. When a data path relating to the UE 100 is set up, the application (e.g., a web browser) of the UE 100 can access the Internet 113 or other networks via the PDN GW 108. The PDN GW 108 uses a link 114 to transfer a data packet from/to the UE 100 to/from the Internet 113 or other networks.

The following considers the case where the UE 100 can use the LIPA and the UE 100 tries to download a certain file (e.g., a data file or a video file) from a server (hereinafter called a media server 115) located in a home network 118. In order to allow the UE 100 to perform a communication to the residential or cooperate network 103, a Local Gateway (LGW 116) connected to the residential or cooperate network 103 has to be allocated to the UE 100. The UE 100 sends a request to the MME 105 to require a connection to the residential or cooperate network 103. The UE 100 informs the MME 105 that the request is for a connection to the residential or cooperate network 103. Considering subscriber information on the UE 100, the MME 105 searches for an appropriate PDN GW for the UE 100. Through this searching procedure, the MME 105 decides to allocate the LGW 116 to the UE 100 for the LIPA in the residential or cooperate network 103. The MME 105 requests the LGW 116 to set up an EPS bearer (link 117) necessary for the UE 100 and inform the MME 105 that the EPS bearer is set up.

Herein, the LGW 116 and the HeNB 104 can communicate with each other (via link 119). For instance, when the LGW 116 has a data packet relating to the UE 100, the data packet is transmitted via the link 119. When the UE 100 leaves the residential or cooperate network 103, the LGW 116 communicates with the SGW 109 (via link 120) and can support a remote access to the residential or cooperate network 103. The remote access to the residential or cooperate network 103 is permitted on the basis of a user's subscriber profile.

When the MME 105 is informed that the EPS bearer is set up, the MME 105 requests the HeNB 104 to set up a radio bearer necessary for the UE 100. Herein, the MME 105 passes an identifier of the EPS bearer to the HeNB 104, whereby the HeNB 104 can create mapping of the radio bearer of the UE 100 with the EPS bearer. When the radio bearer for the UE 100 is set up, the UE 100 can start a data communication at the residential or cooperate network 103. For instance, the UE 100 can download a data file from the media server 115. In this case, a data path will pass through link 121 where the LGW 116 has a connection with the home network 118. A usual connection to the Internet can be provided to a user in the residential or cooperate network 103, whereby the UE 100 is permitted to access the Internet. For instance, traffic from the Internet 113 reaches the home network 118 via link 122, and subsequently reaches the LGW 116 via the link 121. The LGW 116 transfers the traffic from the Internet 113 to the UE 100. Herein, the above description is one example implemented with one arrangement configuration at the residential or cooperate network 103, and the residential or cooperate network 103 may have a different arrangement configuration.

When receiving, from a Mobile Switching Center (MSC 128), a trigger indicating that an incoming CS call addressed to the UE 100 exists, the MME 105 transmits a CS service notification to the UE 100 to inform that a CS call is pending (pending CS call exists). This trigger is transmitted via link 129. Receiving a response from the UE 100 that the UE 100 receives the incoming CS call, the MME 105 informs the HeNB 104 that the UE 100 has a pending CS call. Receiving the notification about a pending CS call relating to the UE 100, the HeNB 104 searches for an appropriate CS domain to let the UE 100 receive the CS call. Assume herein that the HeNB 104 can estimate that a Base Station Subsystem (BSS) 123 is an appropriate candidate to handle the CS call of the UE 100 using a measurement report from the UE 100, for example. In this case, the HeNB 104 requests the MME 105 to transfer a request to the BSS 123 requesting to prepare for a handover of the UE 100 to the UTRAN 102. The MME 105 finds that the BSS 123 is managed by the MSC 128 and connects to the MSC 128 via the link 129. As described above, it is assumed that the UTRAN 102 cannot support a PS service. Therefore, the MME 105 performs a communication with the MSC 128 to let the UE 100 perform a handover to the UTRAN 102.

The MME 105 passes necessary context (e.g., a security key) to the MSC 128, whereby the MSC 128 can prepare for reception of the incoming CS call of the UE 100. When the MSC 128 finds that the UE 100 is to be handed over to the UTRAN 102, the MSC 128 informs the BSS 123 via link 130 to prepare for a radio resource of the CS call. When the BSS 123 becomes ready for reception of the UE 100, the BSS 123 informs the HeNB 104 to issue an instruction to the UE 100 to switch to the UTRAN 102 (via the MSC 128 and the MME 105). Then, the UE 100 switches to the UTRAN 102 and receives the incoming CS call.

Herein, when the UTRAN 102 supports PS traffic as well, a SGSN (Serving GPRS Support Node) 124 will perform the processing relating to a handover of PS traffic of the UE 100. In this case, the MME 105 passes necessary context (e.g., a security key) to the SGSN 124, whereby the SGSN 124 can prepare for the PS traffic of the UE 100. The MME 105 further informs the SGSN 124 of an EPS bearer identifier. The SGSN 124 creates mapping of the EPS bearer identifier to a corresponding packet data protocol (PDP) context, and passes the EPS bearer identifier to the BSS 123. The SGSN 124 further sets up a connection to any one of the PDN GW 108 and the LGW 116 via the SGW 109 (link 127) for a PS session of the UE 100. For instance, when the UE 100 is permitted to make a remote access to the residential or cooperate network 103, the UE 100 can continue a data connection to the LGW 116 in the UTRAN 102 (via links 126, 127 and 120).

FIG. 2 shows another exemplary network system relating to the conventional technique and embodiments of the present invention. FIG. 2 exemplifies a system described in the 3GPP. In this system, a UE 200 is registered with an operator so as to receive both of a PS service and a CS service. Assume that the UE 200 exists in the range where an E-UTRAN 201 and a UTRAN 202 overlap. Assume further that the E-UTRAN 201 is a pure PS domain and the UTRAN 202 supports both of a PS domain and a CS domain. The UE 200 currently connects to the E-UTRAN 201. In the E-UTRAN 201, an eNB 203 provides a radio access channel in the E-UTRAN 201 to the UE 200. In order to control an access method of the UE 200 to a service provided by the cellular operator, a MME 204 executes an authentication procedure and an access control procedure necessary for the UE 200. When the UE 200 is authenticated and authorized for a service provided by the cellular operator, the MME 204 informs the eNB 203 to provide a necessary resource (link 205) and establishes a radio connection (i.e., a radio channel) to the UE 200.

When the UE 200 is authorized to receive a data service (e.g., video streaming from a media server 208) via an EPC 206 of the cellular operator, the MME 204 selects an appropriate PDN GW (PDN GW 207) to let the UE 200 access the data service. The MME 204 selects an appropriate serving gateway (SGW 209) as well to let the UE 200 access the data service. The MME 204 requests the SGW 209 to set up a necessary connection (link 211) to the PDN GIN 207 for the UE 200. The MME 204 further requests the SGW 209 to set up a necessary EPS bearer (link 212) to the eNB 203 for the UE 200. When a data path relating to the UE 200 is set up, the application (e.g., a media player) of the UE 200 can access the Internet 213 or other networks via the PDN GW 207. The PDN GW 207 uses link 214 to transfer a data packet from/to the UE 200 to/from the Internet 213 or other networks.

When receiving, from a MSC 222, a trigger indicating that an incoming CS call addressed to the UE 200 exists, the MME 204 transmits a CS service notification to the UE 200 to inform that it is a pending CS call. This trigger is transmitted via link 223. Receiving a response from the UE 200 that the UE 200 receives the incoming CS call, the MME 204 informs the eNB 203 that the UE 200 has a pending CS call. Receiving the notification about a pending CS call relating to the UE 200, the eNB 203 searches for an appropriate CS domain to let the UE 200 receive the CS call. Assume herein that the eNB 203 can estimate that a BSS 215 is an appropriate candidate to handle the CS call of the UE 200 using a measurement report from the UE 200, for example. In this case, the eNB 203 requests the MME 204 to transfer a request to the BSS 215 requesting to prepare for a handover of the UE 200 to the UTRAN 202. The MME 204 finds that the BSS 215 is managed by the MSC 222 and connects to the MSC 222 via the link 223. As described above, it is assumed that the UTRAN 202 cannot support a PS service. Therefore, the MME 204 performs a communication with the MSC 222 to let the UE 200 perform a handover to the UTRAN 202.

The MME 204 passes necessary context (e.g., a security key) to the MSC 222, whereby the MSC 222 can prepare for reception of the incoming CS call of the UE 200. When the MSC 222 finds that the UE 200 is to be handed over to the UTRAN 202, the MSC 222 informs the BSS 215 via link 224 to prepare for a radio resource of the CS call. When the BSS 215 becomes ready for reception of the UE 200, the BSS 215 informs the eNB 203 to issue an instruction to the UE 200 to switch to the UTRAN 202 (via the MSC 222 and the MME 204). Then, the UE 200 switches to the UTRAN 202 and receives the incoming CS call.

Herein, when the UTRAN 202 supports PS traffic as well, a SGSN 216 will perform the processing relating to a handover of PS traffic of the UE 200. In this case, the MME 204 passes necessary context (e.g., a security key) to the SGSN 216, whereby the SGSN 216 can prepare for the PS traffic of the UE 200. The MME 204 further informs the SGSN 216 of an EPS bearer identifier. The SGSN 216 creates mapping of the EPS bearer identifier to a corresponding PDP context, and passes the EPS bearer identifier to the BSS 215. The SGSN 216 further sets up a connection to the PDN GW 207 via the SGW 209 (link 219) for a PS session of the UE 200. Thereby, the UE 200 can continue a data connection to the PDN GW 207 in the UTRAN 202 (via links 218, 219 and 211).

Assume herein that the SGSN 216 decides to offload the data connection between the UE 200 and the PDN GW 207 to a GGSN (Gateway GPRS Support Node) 220, thus executing SIPTO for this data connection. In this case, data traffic of the UE 200 will be managed by the GGSN 220. Herein, the reason for the SGSN 216 triggering the SIPTO is that the policy of the SGSN 216 detects that the link 219 is not efficient for routing of the data traffic of the UE 200 and consumes a large quantity of network resources, for example. Another reason is that the link 219 is in a congestion state and cannot support the data traffic of the UE 200, for example.

For instance, assume that the application (e.g., a video player) of the UE 200 originally performs streaming of video from the media server 208 disposed in the Internet 213 via the PDN GW 207 (links 212, 211 and 214). When the UE 200 performs a handover from the E-UTRAN 201 to the UTRAN 202, the video stream of the UE 200 will be transmitted through the links 218, 219, 211 and 214. Herein, the SGSN 216 detects that the data traffic of the UE 200 is not transferred along an optimum path, and decides to offload, to the GGSN 220, the data connection of the UE 200 to the PDN GW 207. The SGSN 216 requests the UE 200 to disconnect the data connection of the UE 200 to the PDN GW 207 and transmit a request for a data connection. Then, the UE 200 transmits the request and the SGSN 216 selects the GGSN 220 as a data gateway of the UE 200. As a result, the video player of the UE 200 receives a video stream from the media server 208 via the GGSN 220 (links 218, 221 and 222). Herein, the IP address of the UE 200 may change during the offload procedure, and in this case, the progressing session of the UE 200 to the media server 208 may not continue.

Patent Document 1 discloses a method of making a user define a policy set to decide how to handle CSFB. In Patent Document 1, a user configures a policy, as a policy that can be configured inside a UE, for example, such that when there is a currently progressing important PS session, the UE ignores a page relating to CSFB from a network. In another embodiment disclosed, a UE inserts a flag informing a MME that CSFB should not interfere with the current session during a service request procedure.

Patent Document 2 discloses the following technique. When a MME receives an instruction to hand over a UE to a network of another access technique, the MME informs the UE that a PS session of the UE is interrupted, and as a result the UE can resume the data session at a target access network when the UE connects to the target access technique.

Patent Document 3 discloses a method for reselection of a better RAT (Remote Access Technology) that can support voice services. According to the method, a voice application of a UE changes the priority of frequency/RAT in a priority list.

PRIOR ART DOCUMENT

Patent Document

Patent Document 1: U.S. Patent Application Publication No. 2009/0258671A1
Patent Document 2: U.S. Patent Application Publication No. 2010/0135206A1
Patent Document 3: U.S. Patent Application Publication No. 2010/0113010A1

Non-Patent Document

Non-Patent Document 1: 3GPP TS 23.272 (V10.1.0): "Circuit Switched (CS) fallback in Evolved Packet System (EPS)", 2010-09
Non-Patent Document 2: 3GPP TR 23.829 (V1.3.0): "Local IP Access and Selected IP Traffic Offload", 2010-09

When a UE is handed over to another access network by the CSFB, a problem occurs about how to keep session continuity of a PS session of the UE. For instance in FIG. 1, in the case where the UE 100 has a PS session of the LIPA with the media server 115 before a handover to the UTRAN 102 by the CSFB, the UE 100 may not continue the LIPA PS session after a CS call. For instance, this problem occurs because a target access network (e.g., UTRAN or GERAN (GSM/EDGE Radio Access Network) to which the UE connects to receive the CS call does not support a PS service. In this case, the LIPA PS session cannot be handed over. In another case, this problem occurs because a handover of the LIPA PS session from the current service cell is not permitted by policy of the cellular operator, for example. In still another case, user's subscriber information prescribes that a remote access to the LIPA service is not permitted unless the UE exists in a cell having the LIPA service.

Additionally, there may be no enough resources at the target cell to support the LIPA PS session. In this case, when the UE 100 performs a handover from the E-UTRAN 101, after the HeNB 104 triggers the completion of the LIPA PS session and the user completes the CS call, the UE 100 has to establish a new LIPA PS session to the media server 115. A different IP address will be likely to be assigned the new LIPA PS session, and as a result the UE 100 has to restart a download application with the media server 115.

A reason why the UE 100 cannot resume a LIPA PS session depends on how the standard for cell section is implemented in the UE 100. For instance, when the UE 100 enters an idle mode after a CS call, the access stratum (AS) layer may perform a certain radio measurement to determine to what cell the UE 100 has to connect. Currently, the AS in the UE 100 is based on the logic to make the UE 100 stay at the cell having the strongest signal (i.e., the highest signal intensity that the UE 100 detects). Accordingly, the UE 100 may determine that a cell of the UTRAN 102 has the strongest signal and to stay at the UTRAN 102. According to this determination, the UE 100 will not return the connection to the E-UTRAN 101 in order to continue the LIPA PS session with the media server 115 after the CS call.

Similarly in the scenario shown in FIG. 2, when the UE is handed over to another access network by the CSFB, a problem occurs about how to keep session continuity of a PS session of the UE. In FIG. 2, the SGSN 216 detects the GGSN 220 as a candidate suitable for management of a data connection of the UE 200. The SGSN 216 can trigger the SIPTO by offloading the PS session of the UE 200 from the PDN GW 207 to the GGSN 220. A change of the data gateway, however, that the IP address allocated to the UE 200 is changed and as a result a session between the UE 200 and the media server 208 cannot be continued. When the UE 200 selects to return to the E-UTRAN 201 after a CS call, the MME 204 may relocate the data connection of the UE 200 to the PDN GW 207, and as a result the IP address may be changed again.

According to the technique disclosed in Patent Document 1, a UE may ignore a page relating to CSFB from a network, or a notification may be issued so that CSFB should not interfere with a current session (e.g., a PS handover to a CS domain should not occur). That is, the technique disclosed in Patent Document 1 enables an operation so as to allow the UE to stay in the currently-connected network and keep the current state in the current network, and fulfills the object of the present invention (keeping a PS session of the UE when a CS call exists) by another solution of not executing CSFB.

The technique disclosed in Patent Document 2 is based on the assumption that all data sessions can be resumed in the target access network. The present invention, however, assumes another case where a certain PS session cannot be handed over to a target access network because a handover may not be permitted depending on user's subscriber information or a cellular operator does not perform a handover due to handover requirements. Although Patent Document 2 mentions that a data session of a UE can be interrupted, it does not mention the case at all where, when a data session cannot be handed over, the UE returns to the original source access network to resume a data session. Therefore, the technique disclosed in Patent Document 2 is not configured to keep a PS session of a UE in every possible scenario, and does not cope with the problems in the present invention.

In the technique disclosed in Patent Document 3, the priority list may be changed so that, based on a trigger that a UE had a progressing session before execution of a handover by CSFB, the UE returns to E-UTRAN at the end of a CS call to resume a PS session. Although the technique disclosed in Patent Document 3 can change a connection target based on another type of trigger, this document does not mention at all another format other than a voice application of a UE.

SUMMARY OF THE INVENTION

In order to cope with at least the aforementioned problems and drawbacks practically, it is an object of the present invention to allow a communication terminal, even after a handover between different types of networks, to determine whether a communication that was in progress in the access network connected before the handover can be resumed or not. More specifically, it is an object of the present invention to allow a UE to, even after a handover to another access network to originate a CS call (call origination) or receive a CS call (call reception), continue a progressing PS session of the UE in a certain access network.

In order to fulfill the above-stated object, a communication terminal of the present invention is connectable to a network including a first network and a second network, the first network supporting a first communication technique but not a second communication technique, the second network supporting the second communication technique. The communication terminal includes: a first communication unit that connects to the first network and performs a communication by the first communication technique; a second communication trigger acquisition unit that, during a communication by the first communication technique, acquires a trigger to start a communication by the second communication technique; a second communication unit that switches a connection from the first network to the second network in response to the trigger and starts a communication by the second communication technique; a condition acquisition unit that acquires a predetermined communication resumption condition from the network before the communication by the second communication technique started in response to the trigger is completed; and a resumption determination unit that determines on a basis of the predetermined communication resumption condition whether a communication by the first communication technique from a time when the connection is switched from the first network to the second network can be resumed or not after completion of the communication by the second communication technique.

This configuration allows a communication terminal performing a communication using a certain communication technique in a certain access network, even after a handover to another access network to perform a communication using another communication technique, to determine whether a communication that was in progress in the access network connected before the handover can be resumed or not.

In order to fulfill the above-stated object, a network node of the present invention is in a network including a first network and a second network, the first network supporting a first communication technique but not a second communication technique, the second network supporting the second communication technique and the network node resides in the first network. The network node includes: a communication resumption condition provision unit that provides a predetermined communication resumption condition to a communication terminal connecting to the first network and performing a communication by the first communication technique. When the communication terminal performing a communication by the first communication technique acquires a trigger to start a communication by the second communication technique and switches a connection from the first network to the second network in response to the trigger to start a communication by the second communication technique, the predetermined communication resumption condition includes information indicating whether the communication terminal can resume a communication by the first communication technique from a time when the connection is switched from the first network to the second network after completion of the communication by the second communication technique.

This configuration allows a communication terminal performing a communication using a certain communication technique in a certain access network, even after a handover to another access network to perform a communication using another communication technique, to determine whether a communication that was in progress in the access network connected before the handover can be resumed or not.

The present invention has an advantageous effect of coping with the conventional problems and drawbacks practically. The present invention has an advantageous effect of allowing a communication terminal, even after a handover between different types of networks, to determine whether a communication that was in progress in the access network connected before the handover can be resumed or not. More specifically, the present invention has an advantageous effect of allowing a UE to, even after a handover to another access network to originate a CS call (call origination) or receive a CS call (call reception), continue a progressing PS session of the UE in a certain access network.

DESCRIPTION OF EMBODIMENTS

The following describes embodiments of the present invention, with reference to the drawings. The following describes a configuration and an operation relating to the network configuration shown in FIG. 1 as the first embodiment and a configuration and an operation relating to the network configuration shown in FIG. 2 as the second embodiment.

The present invention provides a technique of, when a UE has a PS session in a first network and even after a network performs a handover of the UE to a second access network, implementing the continuity of a PS session in the first access network. The network informs the UE of a condition to implement the continuity of the PS session in the first access network. Receiving an instruction to hand over the UE to the second network, the network applies the condition informed to the UE to the PS session of the UE in the first access network. The condition provided to the UE on the first access network may include requesting the UE to execute a certain action in the second access network when the UE exists in the second access network, for example. After completing the session in the second access network, the UE verifies whether the condition provided from the first access network is still valid or not. Then, if this condition is valid, the UE returns the connection to the first access network, and resumes a PS session that the UE had in the first access network before the handover.

First Embodiment

Figure 3:
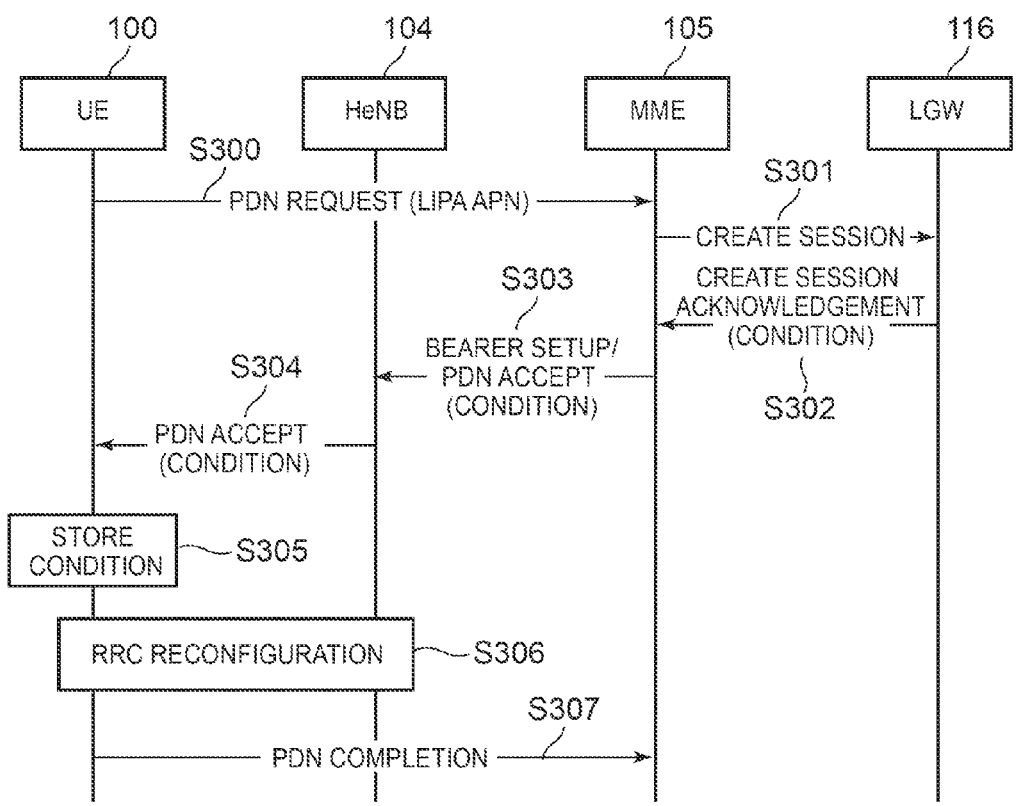
FIG. 3 is a message sequence chart to describe an exemplary method to inform a UE to keep a LIPA PS session relating to the UE in a first embodiment of the present invention.

To begin with, the first embodiment of the present invention is described below. In the first embodiment, the present invention is described referring to an exemplary network configuration shown in FIG. 1. FIG. 3 is a message sequence chart to describe an exemplary method to inform a UE to keep a LIPA PS session relating to the UE in the first embodiment of the present invention. This example assumes that a user tries to make a UE 100 download a certain data file from a media server 115. The UE 100 transmits a PDN connection request message to a MME 105 (Step S300). The PDN connection request message contains an Access Point Name (APN) or an indicator to allow the MME 105 to find that a LIPA connection to a LGW 116 is to be established. After confirming that the UE 100 is permitted to perform this LIPA connection, the MME 105 transmits a create session message, thereby informing the LGW 116 that the UE 100 tries to perform the LIPA connection (Step S301). The LGW 116 sends back a create session acknowledgement message to the MME 105, thus accepting the request from the UE 100 tying to perform the LIPA connection (Step S302). In the present invention, the LGW 116 further adds a series of conditions (a set of conditions) to the response to the UE 100. Exemplary set of conditions in the first embodiment include, but not limited to, when the UE 100 executes CSFB, for example, a condition that the LGW 116 starts processing to buffer a data packet relating to the UE 100 for a predetermine time instead of not handing over the LIPA connection. The set of conditions may be transmitted, but not limited to, via a new information element of Protocol Configuration Options (PCO) that are conveyed by the create session acknowledgement message.

The MME 105 informs a HeNB 104 using a bearer setup message to create a radio bearer necessary for the LIPA session of the UE 100 (Step S303). The MME 105 further adds a PDN connection accept message to the bearer setup message at Step S303. At this time, the MME 105 copies the PCO of the create session acknowledgement message to the PDN connection accept message. The HeNB 104 transfers the PDN connection accept message to the UE 100 (Step S304). The UE 100 stores the set of conditions provided from the LGW 116 in a database inside the UE 100 (Step S305). Then, the UE 100 and the HeNB 104 continue reconfiguration of a radio channel of the UE 100 for LIPA connection (RRC (Radio Resource Control) reconfiguration) (Step S306), and when the radio channel is reconfigured, the UE 100 transmits a PDN connection accept message to the MME 105, thus signaling the completion of LIPA connection establishment (Step S307). Thereafter, the UE 100 performs a communication with the media server 115 using the LIPA connection and can import a data file.

Figure 4:
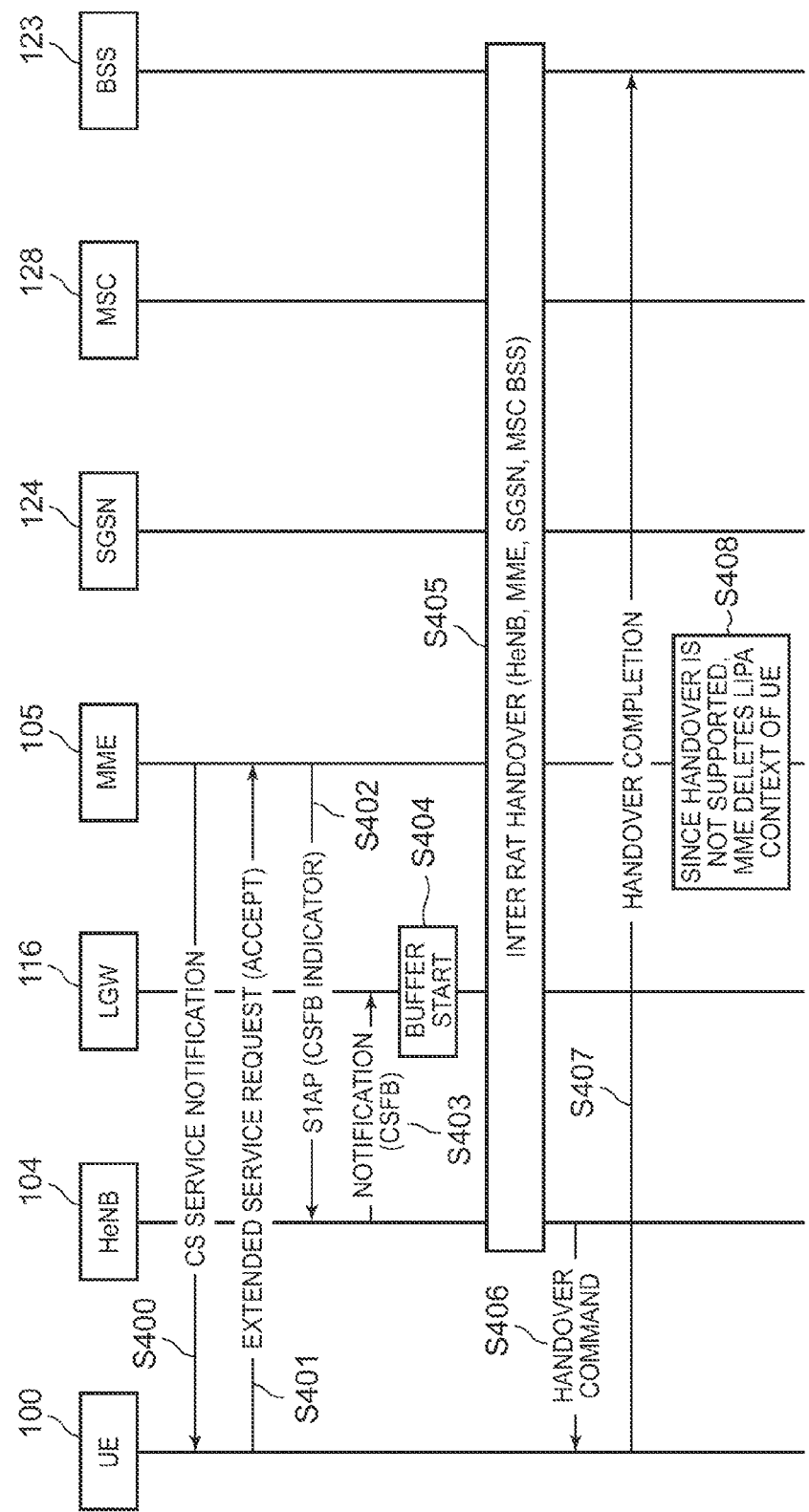
FIG. 4 is a message sequence chart to describe the case where a UE is handed over to another radio access network by CSFB in the first embodiment of the present invention.

FIG. 4 is a message sequence chart to describe the case where a UE is handed over to another radio access network by CSFB in the first embodiment of the present invention. This example assumes that the UE 100 performs a currently progressing communication with the media server 115 to import a data file. Receiving, from a MSC 128, a notification indicating that a pending CS call to the UE 100 exists, the MME 105 transmits a CS service notification message to the UE 100 (Step S400). The UE 100 finds from the CS service notification message that a pending CS call to the UE 100 is present. When a user wants to receive the CS call, the UE 100 transmits an Extended Service Request message to the MME 105 (Step S401). The UE 100 uses the Extended Service Request message to inform that the UE 100 wants to receive the CS call. The reception of the CS call is transmitted by a CSFB response information element of the Extended Service Request message.

Receiving the Extended Service Request message from the UE 100, the MME 105 finds that the UE 100 wants to receive the CS call, and informs the HeNB 104 to start processing for handover of the UE 100 to a CS capability domain. This is implemented by transmission of a S1AP message including a CSFB indicator by the MME 105 to the HeNB 104 (Step S402). When the HeNB 104 finds that the UE 100 executes CSFB, the HeNB 104 informs the LGW 116 that there is a pending CSFB handover (Step S403). Since the first embodiment assumes the case where the HeNB 104 and the LGW 116 are implemented in the same device, this notification may be an implementation specific internal trigger in the device. Receiving the notification from the HeNB 104, the LGW 116 starts processing to buffer subsequent data packets of the UE 100 based on the set of conditions informed to the UE 100 (Step S404).

Next, inter RAT handover procedure of CSFB described in Non-Patent Document 1 is triggered (Step S405). In this inter RAT handover procedure of CSFB, the HeNB 104, the MME 105, a SGSN 124, the MSC 128 and a BSS 123 are involved and they prepare for a radio resource in a CS capable domain. Assume herein that a target RAM (i.e., UTRAN 102) does not support a PS service. When a radio resource for the UE 100 is prepared, the HeNB 104 sends a handover command to inform the UE 100 of a target access CS capable domain selected for the UE 100 (Step S406). The UE 100 performs switching to the selected CS capable domain that is managed by the BSS 123, and transmits to the BSS 123 a handover complete indicating that the UE 100 successfully arrived (Step S407). Since the MME 105 understands that the LIPA connection relating to the UE 100 cannot be handed over to the UTRAN 102, the MME 105 deletes context of the LIPA connection relating to the UE 100 (Step S408).

Figure 5:
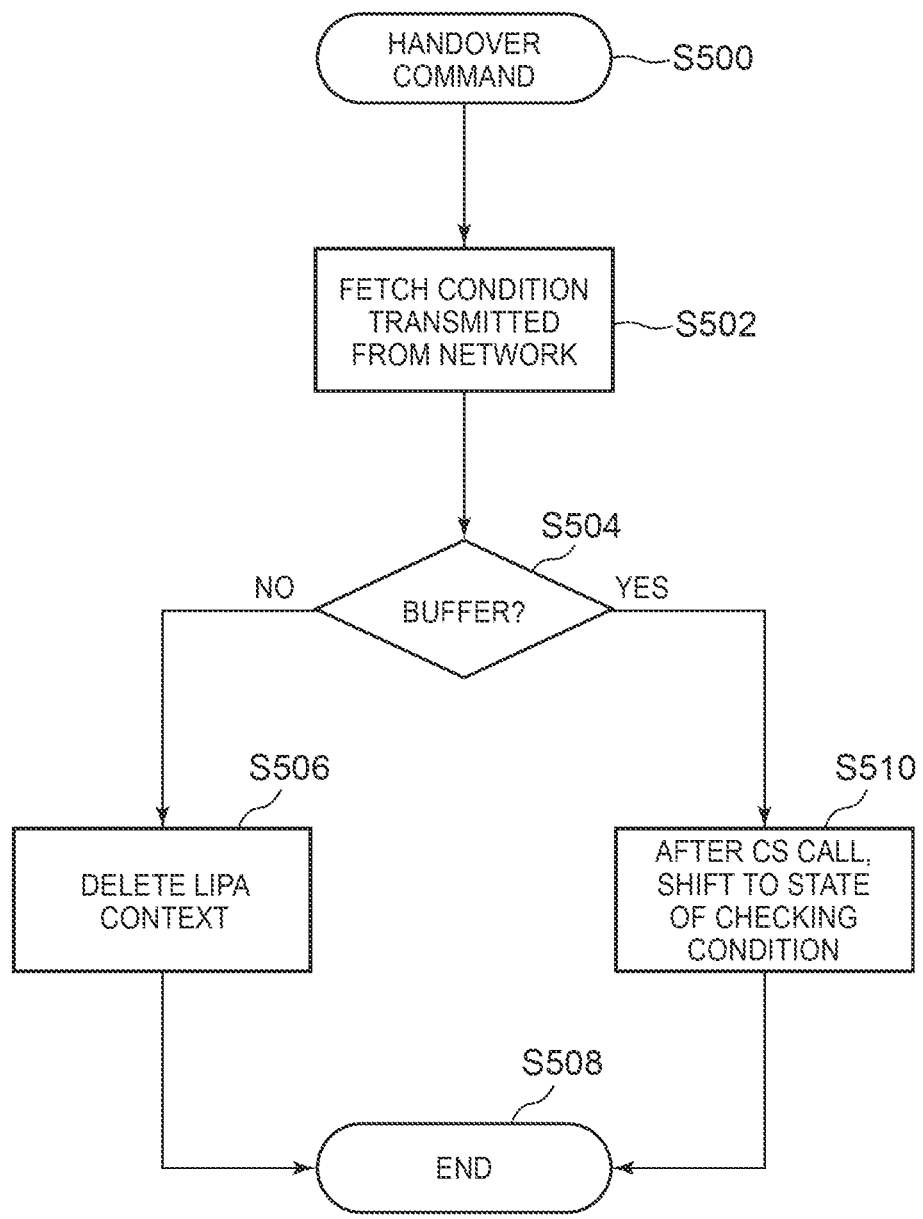
FIG. 5 is a flowchart showing exemplary processing executed by a UE in response to a trigger of CSFB in the first embodiment of the present invention.

When the UE 100 executes CSFB to the CS capable domain, the UE 100 starts a timer inside therein so as to find how long the UE 100 stays in the CS capable domain. FIG. 5 is a flowchart showing exemplary processing executed by the UE in response to a trigger of CSFB in the first embodiment of the present invention. In the first embodiment, when the UE 100 acquires a handover command by CSFB from the HeNB 104, a function thereof is started (Step S500). The function performs processing to fetch, from a database of the UE 100, a set of conditions on the LIPA connection of the UE 100 provided from the LGW 116 (Step S502). Then, based on the fetched set of conditions, the function determines what conditions are set by the LGW 116 for the LIPA connection of the UE 100 (Step S504).

When it is determined that the LGW 116 does not execute buffering on the LIPA PS session of the UE 100, and further when it is determined that the LIPA connection is not handed over to the UTRAN 102, the UE 100 deletes context of the LIPA connection of the UE 100 (Step S506). A method of making the UE 100 determine whether the LIPA connection can be handed over or not may be, but not limited to, based on a handover command message including an EPS bearer identifier of the LIPA connection. Herein, when the handover command message includes an EPS bearer identifier of the LIPA connection, then it is indicated that the network will hand over the LIPA connection of the UE 100 to the UTRAN 102. When the LIPA context is deleted, the function ends (Step S508), and the UE 100 starts handover processing to the CS capable domain selected by the network.

When it is determined that the LGW 116 executes buffering on the LIPA PS session of the UE 100, the function turns the UE 100 in a condition such that the UE 100 checks the set of conditions provided from the LGW 116 after the completion of a CS call (Step S510). In this state, the UE 100 starts a timer inside to find how long a CS call is performed by the UE 100. When the UE 100 is in this state, the function ends (Step S508), and the UE 100 starts handover processing to the CS capable domain selected by the network.

Figure 6:
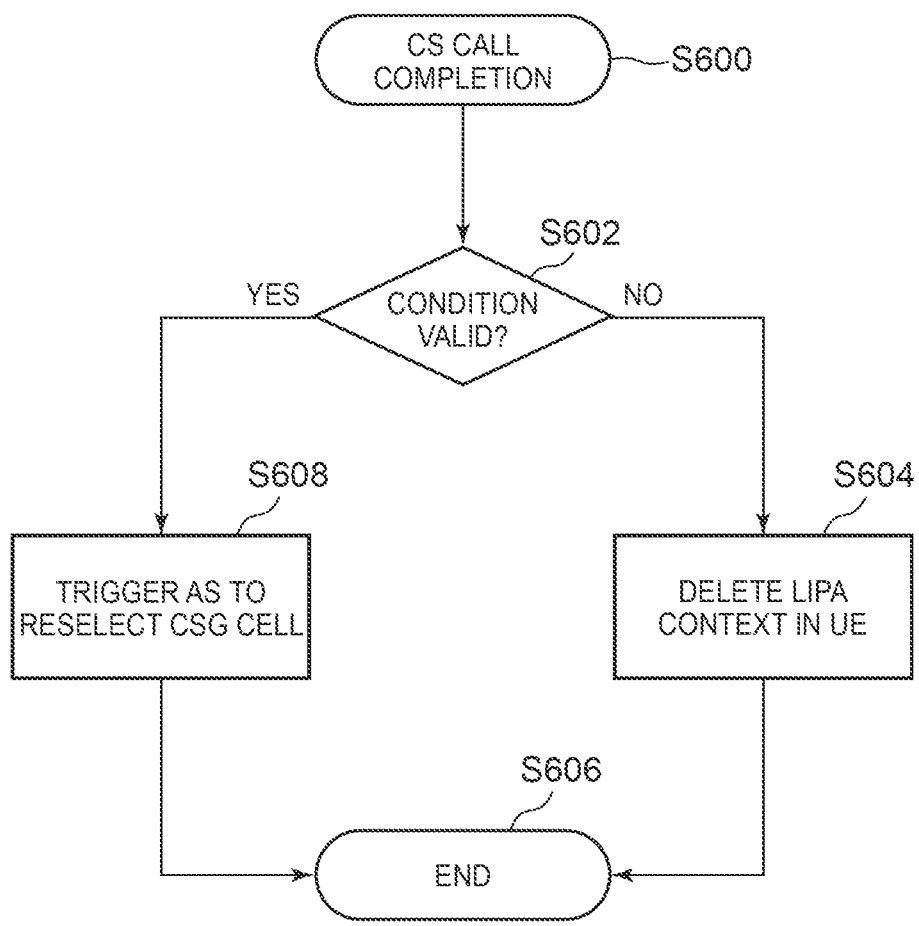
FIG. 6 is a flowchart showing an exemplary procedure performed by the UE after the completion of a CS call in the first embodiment of the present invention.

At the completion of a CS call, the UE 100 checks whether the set of conditions provided from the LGW 116 is still valid or not using the value of the timer. FIG. 6 is a flowchart showing an exemplary procedure performed by the UE after the completion of a CS call in the first embodiment of the present invention. When the UE 100 finishes the CS call and becomes a state of checking the set of conditions provided from the LGW 116 after the completion of a CS call, the function starts (Step S600). Then, the function determines whether the set of conditions provided from the LGW 116 is still valid or not after the CS call (Step S602). When it is determined that the set of conditions provided from the LGW 116 is no longer valid, the UE 100 deletes context of the LIPA connection of the UE 100 (Step S604). When the LIPA context is deleted, the function ends (Step S606). At this time, a graphical user interface (GUI) of the UE 100 may display to the user that the LIPA PS session is disconnected and input from the user is waited for the following step.

On the other hand, when it is determined that the set of conditions provided from the LGW 116 is still valid, the function instructs an access stratum (AS) layer of the UE 100 to make a selection to return to the network where the UE had the LIPA PS session before receiving the CS call (i.e., residential or cooperate network 103) (Step S608). Exemplary methods of determining whether the set of conditions is still valid or not include, but not limited to, checking whether the buffering duration of the LGW 116 is smaller (shorter) than the value of the timer started by the UE 100 (the value indicating how long a CS call was). Exemplary methods of making a selection to return to the residential or cooperate network 103 include, but not limited to, sending by a Non-Access Stratum (NAS) of the UE 100 a manual CSG selection command including a cell identifier of the E-UTRAN 101 only to the AS layer of the UE 100. When the instruction is issued to the AS layer to make a selection to return to the residential or cooperate network 103, the function ends (Step S606).

Figure 7:
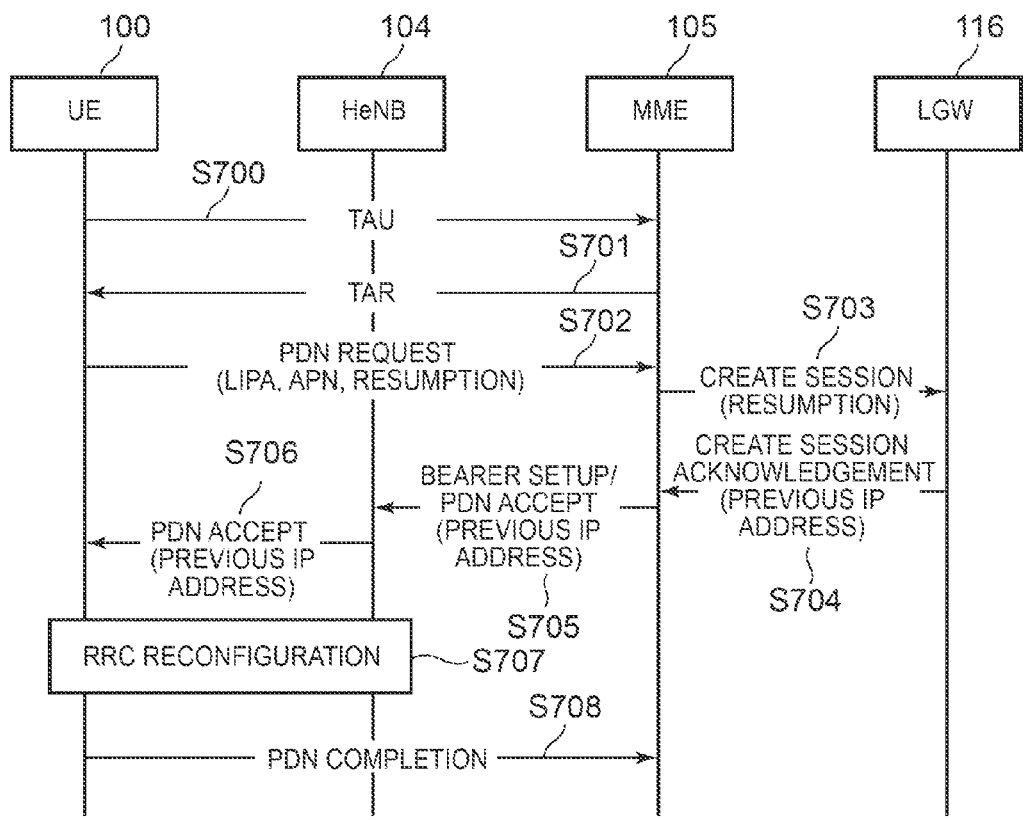
FIG. 7 is a message sequence chart showing an exemplary method of informing a LGW that a UE resumes a LIPA connection in the first embodiment of the present invention.

When the UE 100 makes a selection to return to the residential or cooperate network 103 and connects to the HeNB 104, the UE 100 has to inform the LGW 116 that the UE 100 wants to return to the residential or cooperate network 103 and to resume the LIPA connection. FIG. 7 is a message sequence chart showing an exemplary method of informing a LGW that the UE resumes the LIPA connection in the first embodiment of the present invention.

After connecting to the HeNB 104, the UE 100 transmits a Tracking Area Update (TAU) message to the MME 105 to inform the MME 105 that the UE 100 makes a change from the UTRAN 102 to the E-UTRAN 101 (Step S700). The MME 105 returns a Tracking Area Response (TAR) message to the UE 100, thus accepting the change (Step S701). Next, the UE 100 transmits a PDN connection request message to the MME 105 (Step S702). The PDN connection request message includes an access point name (APN) enabling the MME 105 to find that the UE 100 tries to establish a LIPA connection to the LGW 116. The PDN connection request message further includes an indicator enabling a notification from the UE 100 to the LGW 116 indicating that the UE 100 tries to resume the LIPA connection performed before the buffering by the LGW 116 for the UE 100. Exemplary methods of making a notification from the UE 100 to the LGW 116 include, but not limited to, via a new information element of PCO including the IP address of the LIPA connection that the UE 100 used.

After confirming that the UE 100 is permitted to perform this LIPA connection, the MME 105 transmits a create session message, thereby transmitting the LGW 116 that the UE 100 tries to perform the LIPA connection (Step S703). At this time, the PCO including the IP address of the LIPA connection that the UE 100 used is copied from the PDN connection request message to the create session message. The LGW 116 finds that the UE 100 wants to resume the previous LIPA connection, and reassigns the same IP address that the UE 100 previously used. In order to establish the LIPA connection, the LGW 116 sends back a create session acknowledgement message to the MME 105 (Step S704). The MME 105 informs the HeNB 104 using a bearer setup message to create a radio bearer necessary to enable the LIPA session of the UE 100 (Step S705). Herein, the MME 105 adds a PDN connection accept message to the bearer setup message at Step S705.

Thereafter, the HeNB 104 transfers the PDN connection accept message to the UE 100 (Step S706). The UE 100 checks whether the IP address assigned from the LGW 116 is the same (or similar) IP address as that used in the previous LIPA connection. Then, the UE 100 and the HeNB 104 perform reconfiguration of a radio channel of the UE 100 for LIPA connection (RRC reconfiguration) (Step S707), and when the radio channel is reconfigured, the UE 100 transmits a PDN connection accept message to the MME 105, thus signaling the completion of LIPA connection establishment (Step S708). Thereafter, the UE 100 performs a communication with the media server 115 using the previous LIPA connection and can continue to import a data file. Although not shown in FIG. 7, the LGW 116 transfers the buffered packets of the LIPA PS session to the UE 100.

The following describes an example of the first embodiment specifically. Assume herein that a user using the UE 100 tries to download a video the from the media server 115 in the residential or cooperate network 103. When the UE 100 executes processing required for the LIPA connection establishment in the residential or cooperate network 103, the LGW 116 informs the UE 100 of a set of conditions relating to the LIPA connection. During downloading of a video file, the UE 100 receives, from a network, a notification on the presence of a pending CS call to the user. The user receives this CS call, and the UE 100 receives an instruction from the network so as to perform a handover to the CS capable domain selected by the network.

When the LGW 116 finds that the UE 100 is to be handed over due to the CS call, the LGW 116 starts buffering of a packet of a PS session relating to the LIPA connection of the UE 100. Since the UE 100 notices the set of conditions provided from the LGW 116 during the handover processing and knows that the LGW 116 performs buffering of a packet of a PS session relating to the LIPA connection of the UE 100, the UE 100 shifts to the state of checking the set of conditions after the CS call. Further, the UE 100 starts a timer inside to determine how far the UE 100 is away from the residential or cooperate network 103. Then, after the completion of the CS call, the UE 100 verifies whether the set of conditions provided from the LGW 116 is still valid or not. When the set of conditions is valid, the UE 100 makes a selection to return to the residential or cooperate network 103 and resumes the LIPA connection with the LGW 116. When the UE 100 returns to the residential or cooperate network 103, the UE 100 informs the LGW 116 that the UE 100 returned to resume the LIPA connection. The LGW 116 reassigns the same IP address as that the UE 100 used previously for the LIPA connection, and transfers the buffered packets of the PS session of the UE 100 to the UE 100.

In this first embodiment, even after the UE 100 is handed over to another access network due to a CS call (i.e., to execute or receive a CS call), the continuing of a currently-progressing PS session of the UE 100 in a certain network is permitted, thereby fulfilling the object of the present invention. This means that, after completion of the CS call by the user, the PS session performed before the CS call (e.g., downloading of a file from a home server) can be resumed. The UE 100 determines based on the conditions provided by the network whether the PS session can be resumed or not. Then, when it is determined that the PS session can be resumed, the UE 100 returns a connection to the original access network (original cell) to resume the PS session.

Note here that, in the above embodiment (first embodiment), at Step S403 of FIG. 4, a notification is made from the HeNB 104 to the LGW 116 indicating that the UE 100 is handed over to another access network by CSFB. Alternatively, the HeNB 104 may not transmit such a notification to the LGW 116. Instead, when the LGW 116 receives a notification from the HeNB 104 indicating that the UE 100 is handed over from the HeNB 104, the LGW 116 starts buffering of a PS session of the LIPA connection of the UE 100. For instance, when the PS session of the LIPA connection of the UE 100 can be handed over to the target access network, a change bearer request, but not limited to, may be used for the notification that the LGW 116 receives (a notification as a trigger to start the buffering). Alternatively, for example, when the PS session of the LIPA connection of the UE 100 cannot be handed over to the target access network, a deletion session request, but not limited to, may be used for the notification that the LGW 116 receives (a notification as a trigger to start the buffering). In this way, in the configuration where the HeNB 104 does not make a notification to the LGW 116, an advantageous effect of eliminating mutual action between the HeNB 104 and the LGW 116 can be obtained. This means that the LGW 116 does not have to distinguish between a handover by CSFB and a handover by mobility of the UE 100.

The above embodiment (first embodiment) assumes the case where the HeNB 104 and the LGW 116 are implemented in a single device. Therefore, when the UE 100 is handed over by CSFB, an implementation specific internal trigger can be used for the notification from the HeNB 104 to the LGW 116. Alternatively, the HeNB 104 and the LGW 116 may be implemented in different devices. In this case, in order to make a notification about a handover of the UE 100 by CSFB, a message has to be exchanged between the HeNB 104 and the LGW 116. Such message exchange may be implemented by S1PA message transmitted from the HeNB 104 to the MME 105 to inform that the UE 100 is handed over by CSFB. In this case, the MME 105 may use a deletion session request message to transfer this notification to the LGW 116 via a SGW 109. When the function of the HeNB 104 and the function of the LGW 116 are implemented in different devices, an advantageous effect of facilitating the manufacturing or setting of these devices can be obtained.

Second Embodiment

Figure 8:
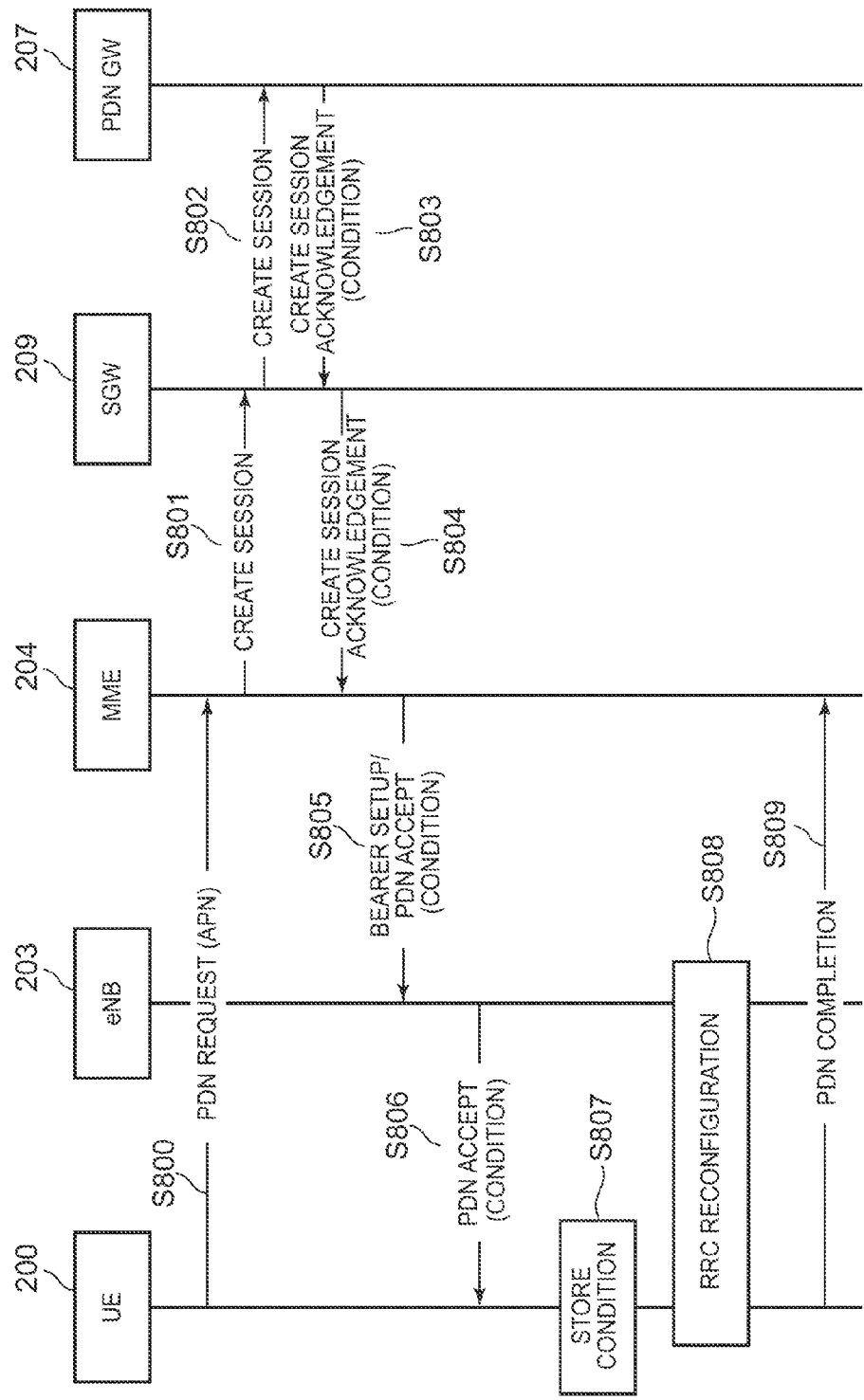
FIG. 8 is a message sequence chart to describe an exemplary method to inform a UE of a condition to keep a PS session relating to the UE in a second embodiment of the present invention.

The following describes the second embodiment of the present invention. In the second embodiment, the present invention is described referring to an exemplary network configuration shown in FIG. 2. FIG. 8 is a message sequence chart to describe an exemplary method to inform a UE of a condition to keep a PS session relating to the UE in the second embodiment of the present invention. The second embodiment assumes that a user tries to make a UE 200 receive video streaming from a media server 208. To this end, the UE 200 transmits a PDN connection request message to a MME 204 (Step S800). The PDN connection request message may include an access point name (APN) enabling the MME 204 to find that the UE 200 tries to establish a PDN connection to a specific APN. After confirming that the UE 200 is permitted to create a PDN connection, the MME 204 transmits a create session message, thereby informing a SGW 209 that the UE 200 wants a PDN connection (Step S801). The SGW 209 transfers the create session message to a PDN GW 207 to transmit to the PDN GW 207 that the UE 200 wants a PDN connection (Step S802).

The PDN GW 207 makes an inquiry to a Policy Control and Charging Rules Function (PCRF), and thereafter accepts a request from the UE 200 to create a PDN connection and makes a response to the SGW 209 using a create session acknowledgement message (Step S803). In the present invention, the PDN GW 207 further adds a set of conditions to the response to the UE 200, and in the second embodiment, the set of conditions may include, but not limited to, a condition that the PDN GW 207 starts processing of performing buffering of a data packet of the UE 200 only for a predetermined time when the UE 200 executes CSFB, for example. Alternatively, the PDN GW 207 may hand over a PDN connection, and the set of conditions may include a condition whether a PDN connection is to be handed over. Since the PDN GW 207 performs buffering of a data packet, the UE 200 has to delete this PDN session at a target access network when the PDN connection is handed over. The set of conditions may be transmitted, but not limited to, via a new information element of protocol configuration options (PCO) that are conveyed by the create session acknowledgement message. The SGW 209 transfers the create session acknowledgement message to the MME 204 (Step S804).

The MME 204 informs an eNB 203 using a bearer setup message to create a radio bearer necessary for the PDN connection of the UE 200 (Step S805). The MME 204 further may add a PDN connection accept message to the bearer setup message at Step S805. At this time, the MME 204 copies a PCO of the create session acknowledgement message to the PDN connection accept message. The eNB 203 transfers the PDN connection accept message to the UE 200 (Step S806). The UE 200 stores the set of conditions provided from the PDN GW 207 in a database inside the UE 200 (Step S807). Then, the UE 200 and the eNB 203 continue reconfiguration of a radio channel of the UE 200 for PDN connection (Step S808), and when the radio channel is reconfigured, the UE 200 transmits a PDN connection accept message to the MME 204, thus signaling the completion of PDN connection establishment (Step S809). Thereafter, the UE 200 performs a communication with the media server 208 using the PDN connection and can import a video file.

Figure 9:
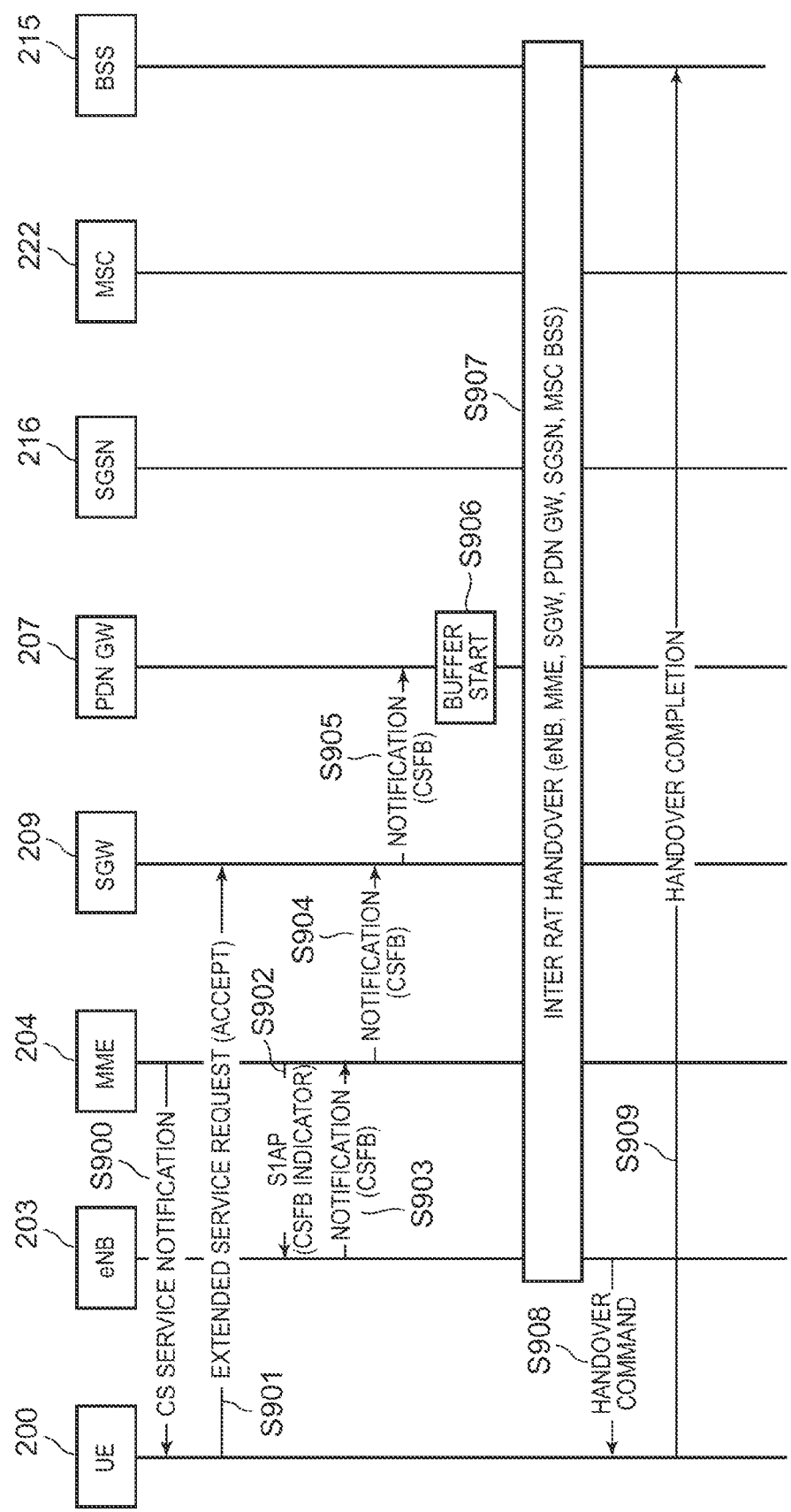
FIG. 9 is a message sequence chart to describe an event as to whether a UE is handed over to another radio access network or not due to CSFB in the second embodiment of the present invention.

FIG. 9 is a message sequence chart to describe an event as to whether a UE is handed over to another radio access network or not due to CSFB in the second embodiment of the present invention. This example assumes that the UE 200 performs a currently progressing communication with the media server 208 and acquires video streaming from the media server 208. Receiving, from a MSC 222, a notification indicating that a pending CS call to the UE 200 exists, the MME 204 transmits a CS service notification message to the UE 200 (Step S900). The UE 200 can find from the CS service notification message that a pending CS call to the UE 200 is present. When a user wants to receive the CS call, the UE 200 transmits an Extended Service Request message to the MME 204 (Step S901). The UE 200 uses the Extended Service Request to inform that the UE 200 wants to accept the CS call. This is transmitted by a CSFB response information element of the Extended Service Request message, for example.

Receiving the Extended Service Request message from the UE 200, the MME 204 finds that the UE 200 wants to accept the CS call, and informs the eNB 203 to start processing for handover of the UE 200 to a domain having CS capability. This is implemented by transmission of a S1AP message including a CSFB indicator by the MME 204 to the eNB 203 (Step S902). When the eNB 203 finds that the UE 200 executes CSFB and the UE 200 has a SIPTO PS session, the eNB 203 informs the PDN GW 207 that there is a pending CSFB handover. This notification is passed at Steps S903, S904 and S905 from the eNB 203 to the PDN GW 207 via the MME 204 (e.g., using a handover required message) and via the SGW 209 (e.g., using a Delete Session Request message). Receiving the notification from the eNB 203, the PDN GW 207 starts processing to buffer subsequent data packets of the UE 200 based on the set of conditions informed to the UE 200 (Step S906).

Next, inter RAT handover procedure of CSFB described in Non-Patent Document 1 is triggered (Step S907). In this inter RAT handover procedure of CSFB, the eNB 203, the MME 204, the SGW 209, the PDN GW 207, a SGSN 216, the MSC 222 and a BSS 215 are involved and they prepare for a radio resource in a CS capable domain. Assume herein that a target RAM (i.e., UTRAN 202) does not support a PS service. When a radio resource for the UE 200 is prepared, the eNB 203 sends a handover command to inform the UE 200 of a target access CS capable domain selected for the UE 200 (Step S908). The UE 200 performs switching to the selected CS capable domain that is managed by the BSS 215, and transmits to the BSS 215 a handover complete indicating that the UE 200 successfully arrived (Step S909).

Figure 2:
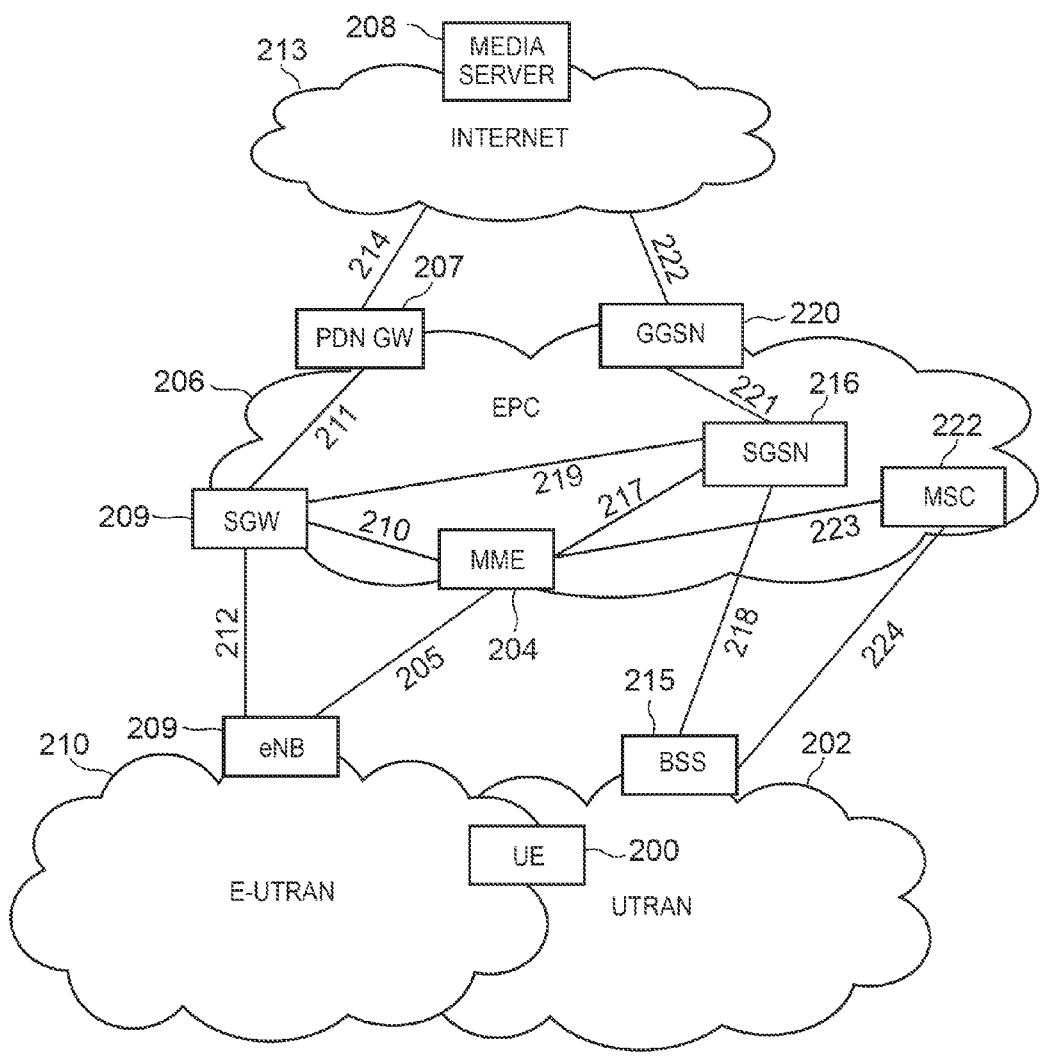
FIG. 2 shows another exemplary network system relating to the conventional technique and embodiments of the present invention.

On the other hand, when the target access network supports a PS service, then since the UTRAN 202 also supports a PS service, the MME 204 hands over the PS session of the UE 200 to the SGSN 216. As a result, the UE 200 is able to continue the PS session at the UTRAN 202. However, a data signaling path becomes a not-optimized state. Referring to FIG. 2, in order to let the UE 200 continue video streaming from the 208, the data path will be links 218, 219, 211 and 214. Such a not-optimized data path may increase a consumption amount of an EPC resource at a cellular operator. To prevent the use of such a not-optimized path, the UE 200 may delete a PS service from an EPC 206, for example.

Figure 10:
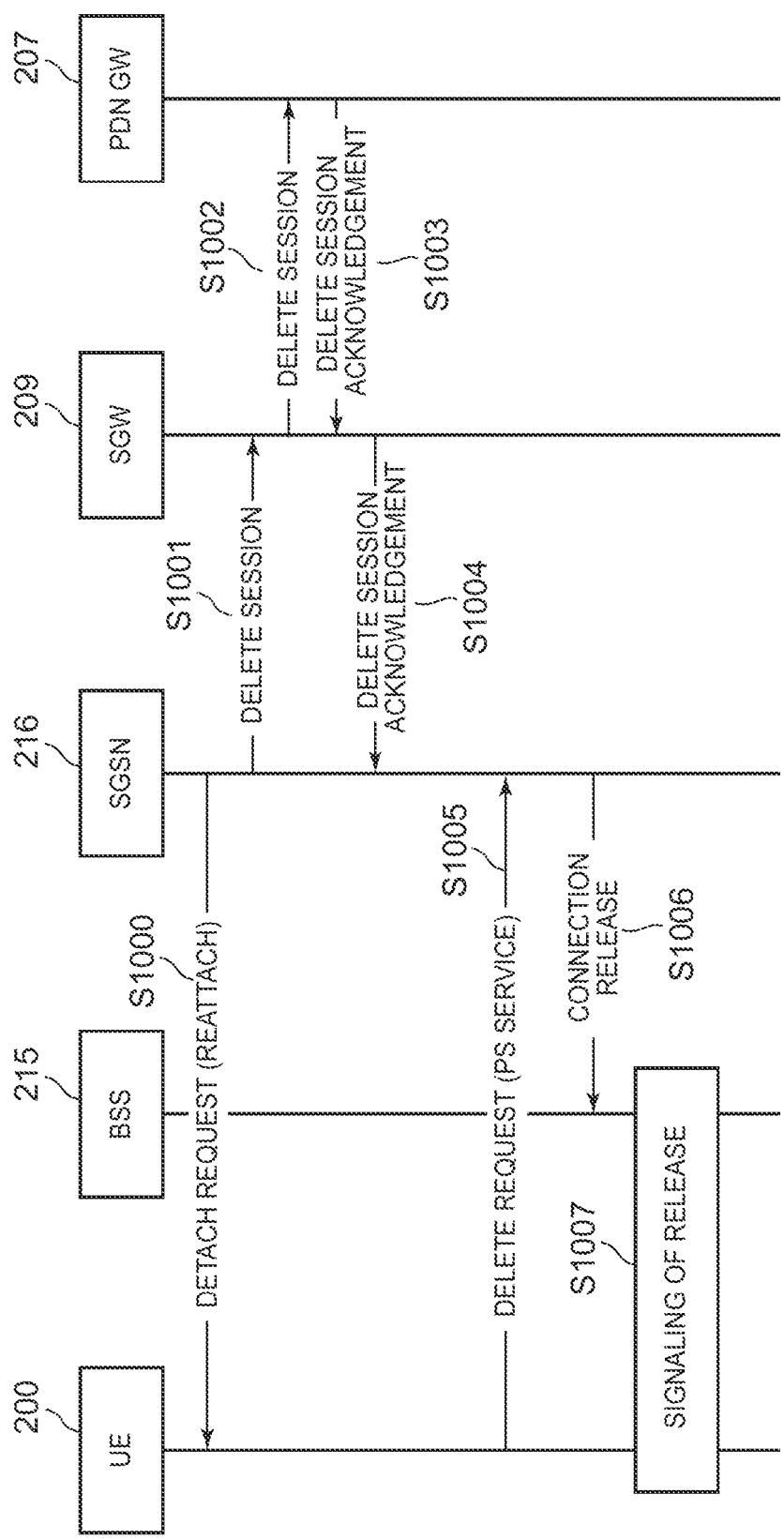
FIG. 10 is message sequence chart to show an exemplary case where, after a UE is handed over to another radio access network, a network triggers SIPTO in the second embodiment of the present invention.

FIG. 10 is message sequence chart to show an exemplary case where, after a UE is handed over to another radio access network, a network triggers deletion of a PS session in the second embodiment of the present invention. When the SGSN 216 detects that a current data connection relating to a PS session of the UE 200 is not optimized, the SGSN 216 transmits a Detach Request message to the UE 200 (Step S1000). The SGSN 216 may insert a cause value of reattach to the detach request message, and may inform that the UE 200 executes attach procedure after completion of detach procedure. Further the SGSN 216 transmits a Delete session message to the SGW 209 to delete the PDN connection of the UE 200 (Step S1001). The SGW 209 informs the PDN GW 207 that the PDN connection of the UE 200 is to be disconnected (Step S1002). The PDN GW 207 deletes the PDN connection of the UE 200, and makes a response to the SGW 209 using a Delete session acknowledgement message (Step S1003). Following FIG. 9, the PDN GW 207 already starts buffering of the PS session of the UE 200. The SGW 209 informs the SGSN 216 that the PDN connection of the UE 200 is disconnected (Step S1004).

When the UE 200 handles the detach request message from the SGSN 216, the UE 200 notices the existence of the cause value of reattach in the detach request message, and deletes bearer context information at the PDN GW 207. Herein, the UE 200 finds, when acquiring the handover command at Step S908, whether the PDN connection with the PDN GW 207 is to be handed over to the UTRAN 202. When the handover command includes an identifier of the PDN connection, this means that the PDN connection is to be handed over to the target access network. On the other hand, when the handover command does not include an identifier of the PDN connection, this means that the PDN connection is not to be handed over to the target access network.

Further the UE 200 performs processing of deleting the PDN connection to the PDN GW 207 based on the set of conditions provided from the PDN GW 207 at Step S806. At this time, the UE 200 transmits a Detach request message to the SGSN 216 to delete the connection to the PDN GW 207 (Step S1005). The SGSN 216 uses a Connection release message to request the BSS 215 to release a radio connection relating to the UE 200 (Step S1006). The UE 200 and the BSS 215 perform connection release procedure to release a radio bearer relating to PS traffic of the UE 200 (Step S1007).

Figure 11:
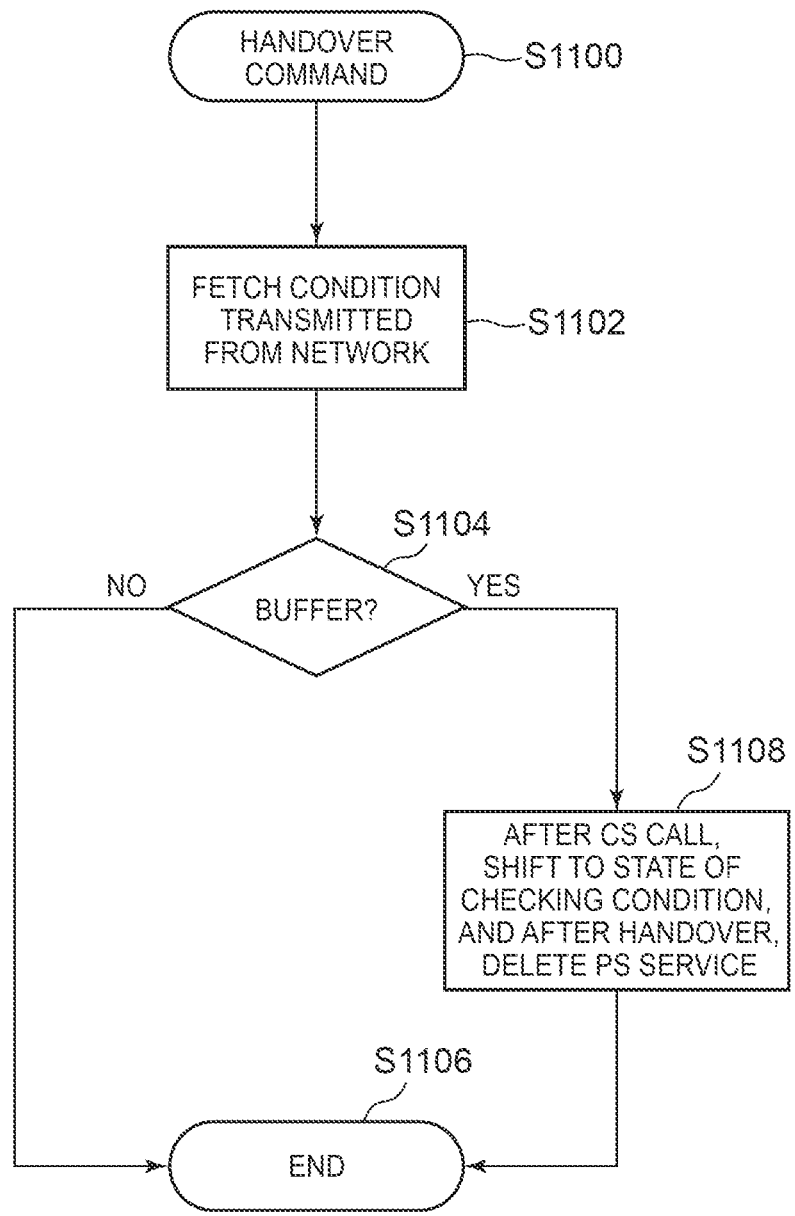
FIG. 11 is a flowchart showing exemplary processing executed by the UE in response to a trigger of CSFB in the second embodiment of the present invention.

The UE 200 starts a timer inside therein when the UE 200 executes CSFB to the CS capable domain so as to find how long the UE 200 stays in the CS capable domain. FIG. 11 is a flowchart showing exemplary processing executed by the UE in response to a trigger of CSFB in the second embodiment of the present invention. In the second embodiment, when the UE 200 acquires a handover command by CSFB from the eNB 203, a function thereof is started (Step S1100). The function performs processing to fetch, from a database of the UE 200, a set of conditions on the PDN connection of the UE 200 provided from the PDN GIN 207 (Step S1102). Then, based on the fetched set of conditions, the function determines what conditions are set by the PDN GW 207 for the PDN connection of the UE 200 (Step S1104).

When it is determined that the PDN GW 207 does not execute buffering of the PS session of the UE 200, the function ends (Step S1106), and the UE 200 performs handover processing to the CS capable domain selected by the network. On the other hand, when it is determined that the PDN GW 207 executes buffering of the PS session of the UE 200, the function turns the UE 200 in a state such that the UE 200 checks the set of conditions provided from the PDN GW 207 after the completion of a CS call (Step S1108). In this case, the UE 200 starts a timer inside to find how long a CS call is performed by the UE 200. Herein, when the PDN GW 207 executes buffering of the PS session of the UE 200, the function may instruct the UE 200 to, after a handover to the selected CS capable domain is completed and when there is no need to keep the PS session by the PDN GW 207, delete the corresponding PS session from the network. Then, the function ends (Step S1106), and the UE 200 starts handover processing to the CS capable domain selected by the network.

Figure 12:
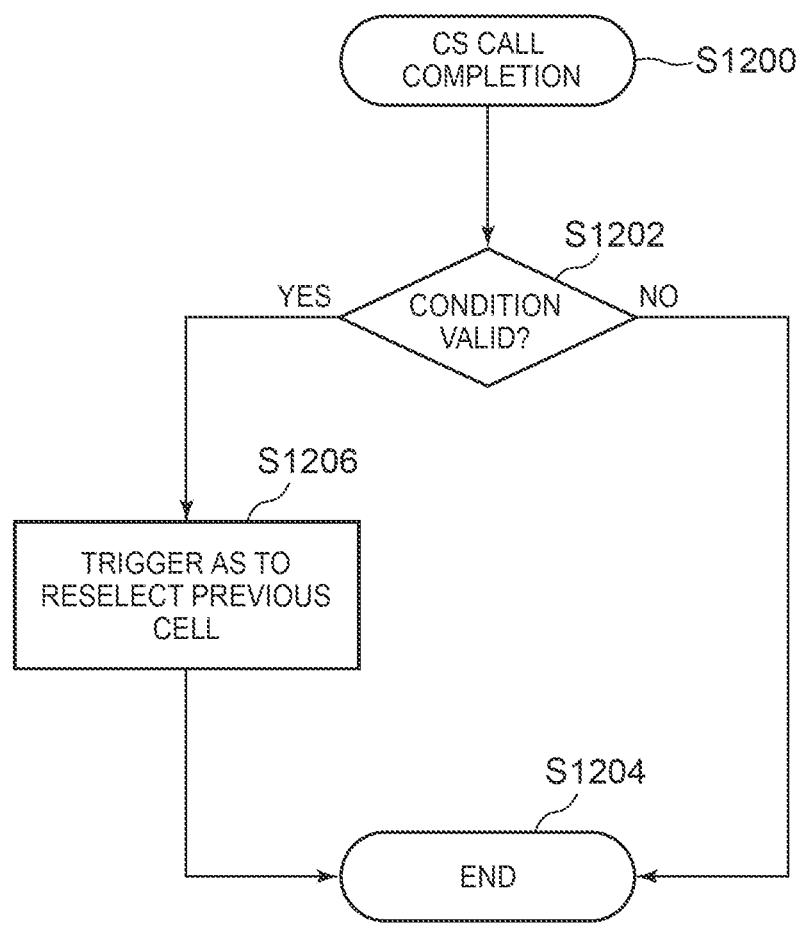
FIG. 12 is a flowchart showing an exemplary procedure performed by the UE after the completion of a CS call in the second embodiment of the present invention.

After the completion of a CS call, the UE 200 checks whether the set of conditions provided from the PDN GW 207 is still valid or not using the value of the timer. FIG. 12 is a flowchart showing an exemplary procedure performed by the UE after the completion of a CS call in the second embodiment of the present invention. When the UE 200 finishes the CS call and becomes a state of checking the set of conditions provided from the PDN GW 207 after the completion of a CS call, the function starts (Step S1200). Then, the function determines whether the set of conditions provided from the PDN GW 207 is still valid or not even after the CS call (Step S1202). When it is determined that the set of conditions provided from the PDN GIN 207 is no longer valid, the function ends (Step S1204). At this time, a graphical user interface (GUI) of the UE 200 may display to the user that the UE 200 no longer has a PS service, and input from the user is waited for the following step.

On the other hand, when it is determined that the set of conditions provided from the PDN GW 207 is still valid, the function instructs an access stratum (AS) layer of the UE 200 to make a selection to return to the previous cell where the UE 200 received a PS service (Step S1206). Exemplary methods of determining whether the set of conditions is still valid or not include, but not limited to, checking whether the buffering duration of the PDN GW 207 is smaller (shorter) than the value of the timer started by the UE 200 indicating how long the buffering duration was. Exemplary methods of making the UE 200 return to the previous cell where the UE 200 received a PS service include, but not limited to, issuing a command from an application layer to the AS layer of the UE 200 so as to set priorities while assigning the highest priority to the cell identifier of an E-UTRAN 201 where the UE 200 previously existed. When issuing the instruction to the AS layer to make a selection to return to the cell where the UE 200 existed previously for a PS service, the function ends (Step S1204).

Figure 13:
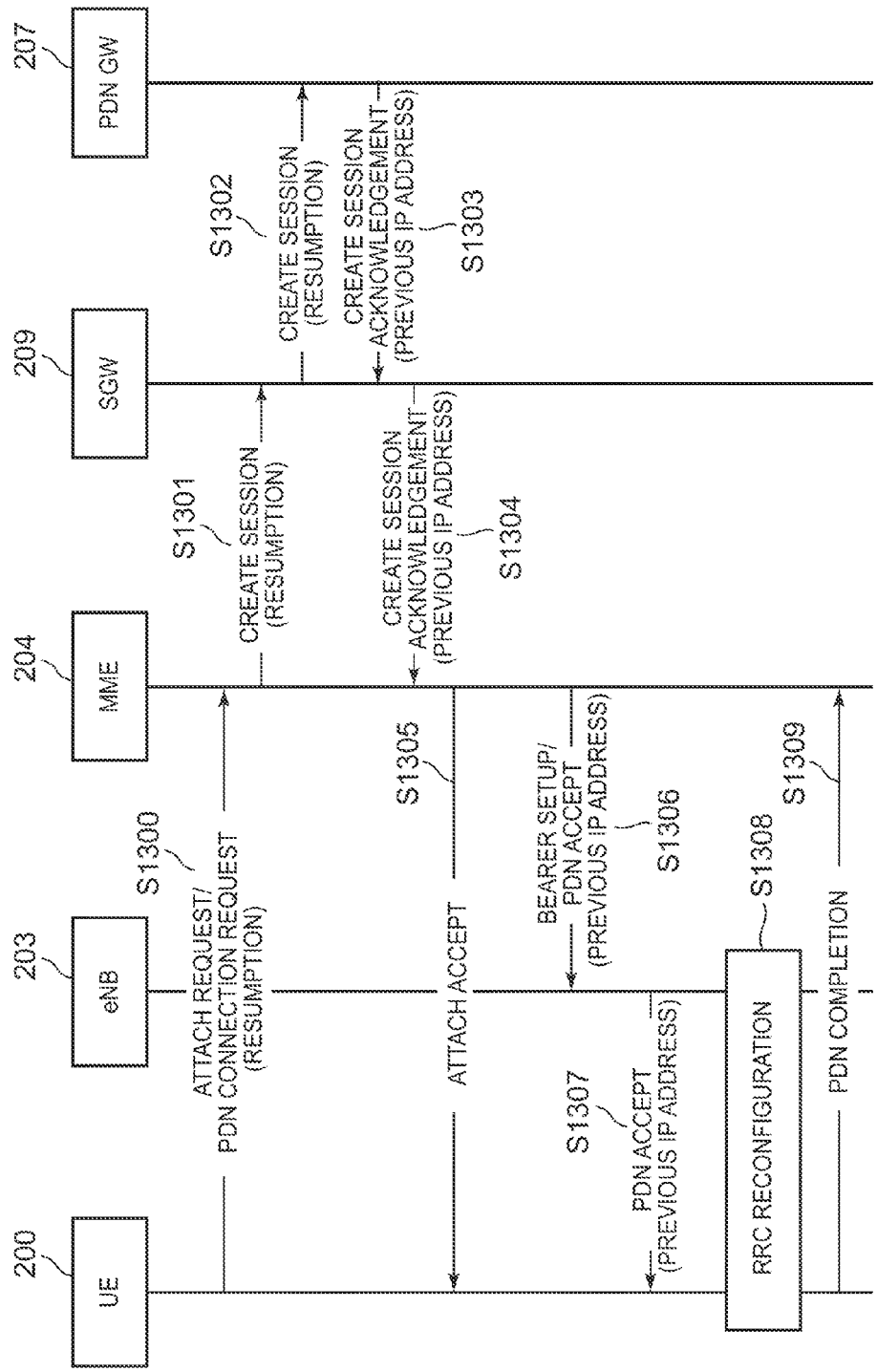
FIG. 13 is a message sequence chart showing an exemplary method of informing a LGW of resumption by the UE of the PDN connection in the second embodiment of the present invention.

When the UE 200 selects to return to the previous cell where the UE 200 existed for a PS service and connects to the eNB 203, the UE 200 informs that the UE 200 returned to the eNB 203 because the UE wants to resume the PDN connection. FIG. 13 is a message sequence chart showing an exemplary method of informing a LGW of resumption by the UE of the PDN connection in the second embodiment of the present invention.

After connecting to the eNB 203, the UE 200 transmits an Attach request message to the MME 204 (Step S1300). The UE 200 further transmits a PDN connection request message to the MME 204, informing that the UE 200 wants a PDN connection. The PDN connection request message may include an indicator inserted therein, informing from the UE 200 to the PDN GW 207 that resumption of the previous PDN connection that the PDN GW 207 performs buffering for the UE 200 is wanted. In this second embodiment, exemplary methods of making a notification from the UE 200 to the PDN GW 207 include, but not limited to, via a new information element of PCO including the IP address of the PDN connection that the UE 200 used.

After confirming that the UE 200 is permitted to perform this PDN connection, the MME 204 transmits a create session message, thereby transmitting the SGW 209 that the UE 200 tries to perform the PDN connection (Step S1301). The PCO including the IP address of the PDN connection that the UE 200 used is copied from the PDN connection request message to the create session message. The SGW 209 transfers the create session message to the PDN GW 207 (Step S1302). The PDN GW 207 finds that the UE 200 wants to resume the previous PDN connection, and reassigns the same IP address that the UE 200 previously used. The PDN GIN 207 sends back a create session acknowledgement message to the SGW 209 to establish the PDN connection (Step S1303). The SGW 209 transfers the create session acknowledgement message to the MME 204 (Step S1304).

The MME 204 transmits an attach accept message, thereby informing the UE 200 of successful attachment to the EPC 206 (Step S1305). The MME 204 further uses a bearer setup message to inform the eNB 203 to create a radio bearer necessary to enable a PDN session of the UE 200 (Step S1306). Herein, the MME 204 may add a PDN connection accept message to the bearer setup message at Step S1306. That is, the bearer setup message at Step S1305 and the PDN connection accept message at Step S1306 may be combined into one. The eNB 203 transfers the PDN connection accept message to the UE 200 (Step S1307). The UE 200 finds that the IP address assigned by the PDN GW 207 is the same IP address as that used in the previous PDN connection. Then, the UE 200 and the eNB 203 perform reconfiguration of a radio channel of the UE 200 for PDN connection (Step 1308), and when the radio channel is reconfigured, the UE 200 transmits a PDN connection accept message to the MME 204, thus signaling the completion of PDN connection establishment (Step S1309). Thereafter, the UE 200 performs a communication with the media server 208 using the PDN connection and can continuously acquire the streaming of a video file. Although not shown in FIG. 13, the PDN GW 207 transfers the buffered packets of the PS session to the UE 200.

The following describes an example of the second embodiment specifically. Assume herein that a cellular operator has a simple policy to always execute SIPTO of every UE 200 so as to optimize the resource of EPC. Assume further that the UE 200 currently connects to the EPC 206 via the PDN GW 207, and performs streaming of a video file from the media server 208. During streaming of a video the from the media server 208, the UE 200 receives, from a network, a notification on the presence of a pending CS call to the user. The user accepts this CS call, and the UE 200 receives an instruction from the network so as to perform a handover to the CS capable domain selected by the network.

When the PDN GW 207 finds that the UE 200 is to be handed over due to the CS call, the PDN GW 207 starts buffering of a packet of a PS session to the UE 200. Since the UE 200 notices the set of conditions provided from the PDN GW 207 during the handover processing and knows that the PDN GW 207 performs buffering of a packet of a PS session relating to the PS session to the UE 200, the UE 200 shifts to the state of checking the set of conditions after the CS call. Further, the UE 200 starts a timer inside to determine how far the UE 200 is away from the previous connected cell. Further, following the instruction from the PDN GW 207, the UE 200 informs the SGSN 216 to complete the PS session when the PS session is handed over. Then, at the time of the completion of the CS call, the UE 200 verifies whether the set of conditions provided from the PDN GW 207 is still valid or not. When the set of conditions is valid, the UE 200 makes a selection to return to the previous cell where the UE 200 existed relating to the PS service and resumes the PDN connection with the PDN GW 207. When the UE 200 returns to the previous cell where the UE 200 existed relating to the PS service, the UE 200 informs the PDN GW 207 that the UE 200 returned to resume the PDN connection. The PDN GW 207 reassigns the same IP address as that the UE 200 used previously, and transfers the buffered packets of the PS session to the UE 200.

In this second embodiment, even after the UE 200 is handed over to another access network due to a CS call (i.e., to execute or receive a CS call), the continuing of a currently-progressing PS session of the UE 200 in a certain network is permitted, thereby fulfilling the object of the present invention. This means that, after completion of the CS call, the user can resume the PS session performed before the CS call (e.g., downloading of a file from a media server). The UE 200 determines based on the conditions provided by the network whether the PS session can be resumed or not. Then, when it is determined that the PS session can be resumed, the UE 200 returns to the original access network (original cell) to resume the PS session. In the second embodiment, the PS session may be handed over to a CS capable domain where the UE 200 receives a CS call.

Note here that, in the above embodiment (second embodiment), at Steps S903 to S905 of FIG. 9, a notification is made from the eNB 203 to the PDN GW 207 indicating that the UE 200 is handed over to another access network by CSFB. Alternatively, the eNB 203 may not transmit such a notification to the PDN GW 207. Instead, when the PDN GW 207 receives a notification from the eNB 203 indicating that the UE 200 is handed over, the PDN GW 207 starts buffering of a PS session of the UE 200. For instance, when the PS session the UE 200 can be handed over to the target access network, a change bearer request, but not limited to, may be used for the notification that the PDN GW 207 receives (a notification as a trigger to start the buffering). Alternatively, for example, when the PS session of the UE 200 cannot be handed over to the target access network, a deletion session request, but not limited to, may be used for the notification that the PDN GW 207 receives (a notification as a trigger to start the buffering). In this way, in the configuration where the eNB 203 does not make a notification to the PDN GW 207, an advantageous effect of eliminating mutual action between the eNB 203 and the PDN GW 207 can be obtained. This means that the PDN GW 207 does not have to distinguish between a handover by CSFB and a handover by mobility of the UE 200.

The above embodiment (second embodiment) assumes the case where the eNB 203 and the PDN GW 207 are implemented in different devices. Therefore, in order to inform that the UE 200 is handed over by CSFB, a standardized message exchange is required between the eNB 203 and the PDN GW 207. This message exchange may be implemented by, for example, transmission by the eNB 203 of a S1AP message (e.g., a handover request message) to the MME 204 to inform that that the UE 200 is handed over by CSFB. In this case, the MME 204 may transfer this notification to the SGW 209 and the PDN GW 207 using a delete session request message, for example. Alternatively, the eNB 203, the SGW 209 and the PDN GIN 207 may be implemented in a single device. In this case, as a notification from the eNB 203 to the SGW 209 and the PDN GW 207 informing that the UE 100 is handed over by CSFB, an implementation specific internal trigger can be used. Implementation of all functions in a single device leads to an advantageous effect of reducing transmission delay that may occur when a message has to be exchanged among functions via an intra-device connection.

<First Derived Example where Sipto is Executed at a Home Femtocell>

The above second embodiment describes the case where offloading of a PS session of the UE 200 by SIPTO occurs at a core network entity of the cellular operator. However, in the first embodiment (the configuration of FIG. 1), when the UE 100 moves to a femtocell having the LGW 116 as well, offloading of a PS session of the UE 100 by SIPTO may occur. For instance, when the UE 100 moves to the residential or cooperate network 103, the MME 105 decides to detect a gateway (LGW 116) geographically closer to the UE 100 for triggering of SIPTO.

Figure 14:
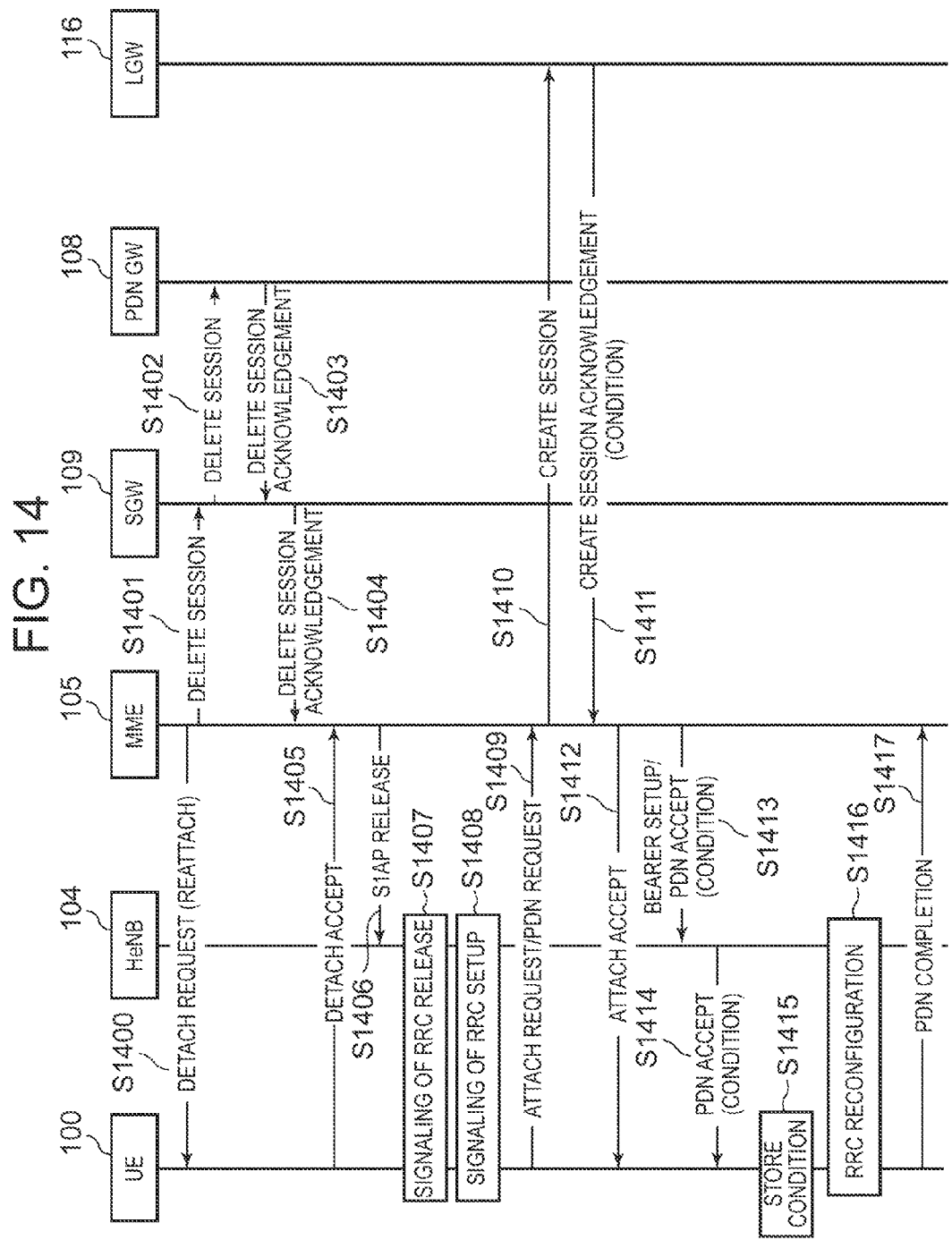
FIG. 14 is a message sequence chart to describe an exemplary method to inform a UE of a condition to keep a SIPTO PS session relating to the UE in the first embodiment of the present invention.

FIG. 14 is a message sequence chart to describe an exemplary method to inform a UE of a condition to keep a SIPTO PS session relating to the UE in the first embodiment of the present invention. This first embodiment assumes that the UE 100 has only one PDN connection to the EPC 107 and the PDN connection is managed by the PDN GW 108. In this case, the MME 105 transmits a Detach Request message to the UE 100 (Step S1400). The MME 105 inserts a cause value of reattach to the detach request message, and informs the UE 100 to execute attach procedure after completion of detach procedure. Further the MME 105 transmits a Delete session message to the SGW 109 to delete the PDN connection of the UE 100 to the PDN GW 108 (Step S1401). The SGW 109 informs the PDN GW 108 that the PDN connection of the UE 100 is to be disconnected (Step S1402). The PDN GW 108 deletes the context of the UE 100, and makes a response to the SGW 109 using a delete session acknowledgement message (Step S1403). The SGW 109 informs the MME 105 that the PDN connection of the UE 100 is disconnected (Step S1404).

When the UE 100 handles the detach request message from the MME 105, the UE 100 notices the existence of the cause value of reattach, and deletes bearer context information at the PDN GW 108. The UE 100 transmits a detach accept message to the MME 105 (Step S1405). The MME 105 uses a S1AP connection release message to request the HeNB 104 to release a RRC connection of the UE 100 (Step S1406). The UE 100 and the HeNB 104 perform RRC connection release procedure to delete all radio bearers of the UE 100 (Step S1407). Then, after the RRC connection release procedure, the detach procedure is completed.

After completion of this detach procedure, the UE 100 executes attach procedure to the EPC 107 in accordance with the instruction of the MME 105. The UE 100 and the HeNB 104 communicate to establish a RRC connection of the UE 100 (Step S1408). When the RRC connection is set up, the UE 100 transmits an Attach request message to the MME 105 (Step S1409). Further, the UE 100 transmits a PDN connection request message as well to the MME 105 to inform that the UE 100 wants a PDN connection to the EPC 107. The MME 105 checks the identifier and the user's subscriber information of the UE 100 and performs processing to select an appropriate gateway for the UE 100. The MME 105 notices the LGW 116 being geographically close to the UE 100, and selects the LGW 116 for the UE 100. Then, the MME 105 performs processing to transmit a create session message to the LGW 116 (Step S1410). The LGW 116 accepts a request from the UE 100 and sends back a create session acknowledgement message to the MME 105, thereby creating a PDN connection (Step S1411). Herein, in the present invention, the LGW 116 further inserts a set of conditions into the response to the UE 100. Herein, the set of conditions may include, but not limited to, a condition that when the UE 100 executes CSFB, the LGW 116 executes a handover of a PDN connection and further starts processing of performing buffering of a data packet of the UE 100 only for a predetermined time. The set of conditions may be transmitted, but not limited to, via a new information element of PCO that is conveyed by the create session acknowledgement message.

The MME 105 transmits an Attach accept message, thereby informing the UE 100 of successful attachment to the EPC 107 (Step S1412). The MME 105 further uses a bearer setup message to inform the HeNB 104 to create a radio bearer necessary to enable a PS session of the UE 100. Herein, the MME 105 may add a PDN connection accept message to the bearer setup message at Step S1413. Herein, the MME 105 copies the PCO in the create session acknowledgement message to the PDN connection accept message. The HeNB 104 transfers the PDN connection accept message to the UE 100 (Step S1414). The UE 100 stores the set of conditions provided from the LGW 116 in a database in the UE 100 (Step S1415). The UE 100 and the HeNB 104 perform reconfiguration of a radio channel of the UE 100 for PDN connection (Step 1416), and when the radio channel is reconfigured, the UE 100 transmits a PDN connection accept message to the MME 105, thus signaling the completion of PDN connection establishment (Step S1417). Thereafter, with the movement of traffic of the UE 100 from the EPC 107, SIPTO relating to the UE 100 becomes valid. The UE 100 uses a PDN connection to the LGW 116 to communicate with an entity on the Internet 113.

Figure 15:
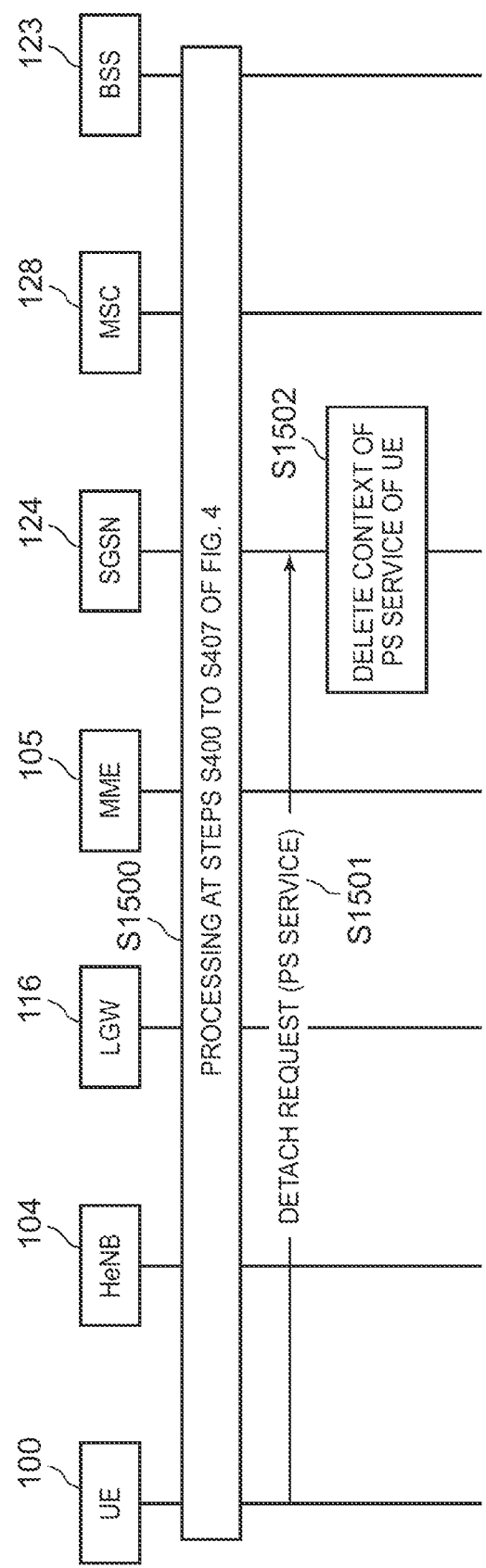
FIG. 15 is a message sequence chart to describe an exemplary case where a UE is handed over to another access network by CSFB in the first embodiment of the present invention.

FIG. 15 is a message sequence chart to describe an exemplary case where a UE is handed over to another access network by CSFB in the first embodiment of the present invention. Receiving, from the MSC 128, a notification indicating that a pending CS call to the UE 100 exists, the MME 105 triggers CSFB procedure to hand over the UE 100 to a CS capability domain (Step S1500). Herein, this Step S1500 is the same as from Steps S400 to S407 of FIG. 4, and so the detailed description thereon is omitted. Since the UTRAN 102 also supports a PS service, the MME 105 hands over the PS session of the UE 100 to the SGSN 124 during the processing from Step S400 to Step S407. As a result, the UE 100 is able to continue the PS session at the UTRAN 102.

In this case, however, a data signaling path is not optimized. Herein, assume that a DSL provider and an EPC belong to the same cellular operator, there is a logical link between the SGW 109 and the LGW 116 relating to the data path of the UE 100 for a handover to the UTRAN 102. This logical link 120 passes through physical links: SGW 109→link 111→link 114→link 122→link 121→LGW 116. For instance, when the UE 100 exists at the UTRAN 102 and transmits a data packet to the Internet 113, the packet will pass through link 126→link 127→link 111→link 114→link 122→link 121→link 121→link 122. Such a not-optimized data path may increase a consumption amount of an EPC resource at a cellular operator.

To prevent the use of such a not-optimized path, the UE 100 may delete a PS session from the EPC 107. When the UE 100 successfully is handed over to the UTRAN 102, the UE 100 transmits a Detach Request Message for a PS service to the SGSN 124 (Step S1501). The UE 100 detaches a PS service because the UE 100 understands that a data packet of the UE 100 is buffered by the LGW 116 based on the set of conditions provided from the LGW 116. This embodiment assumes that entities (i.e., the MME 105 and the SGSN 124) in the EPC 107 are legacy entities for the present invention. Therefore, in order to support the present invention, extension of the functions of the MME 105 and the SGSN 124 is not considered. Therefore, when legacy features are supported, the SIPTO PDN connection is handed over from the MME 105 to the SGSN 124. Transmission of a detach request on a PS service from the UE 100 to the SGSN 124 can prevent erroneous synchronization in a state between the UE 100 and a network when the UE 100 tries to resume a PDN connection for SIPTO after a CS call.

When receiving the detach request message from the UE 100, the SGSN 124 deletes context of a PS service of the UE 100 (Step S1502). When the UE 100 executes CSFB to the CS capable domain, the UE 100 starts a timer inside therein so as to find how long the UE 100 stays in the CS capable domain. The subsequent steps performed to determine whether the UE 100 should make a selection to return to the residential or cooperate network 103 to resume a PS session follow the procedure shown in FIG. 11 and FIG. 12. Therefore, the details thereof are omitted.

In this case as well, even after the UE 100 is handed over to another access network due to a CS call (i.e., to execute or receive a CS call), the continuing of a currently-progressing PS session of the UE 100 in a certain network is permitted, thereby fulfilling the object of the present invention. This means that, after completion of the CS call by the user, the PS session performed before the CS call (e.g., downloading of a media file from a home server) can be resumed. The UE 100 determines based on the conditions provided by the network whether the PS session can be resumed or not.

<Second Derived Example where there are a Plurality of PDN Connections>

The aforementioned first and second embodiments assume that a UE has only one PDN connection to the EPC, and the PDN connection is managed by its PDN GW. However, the UE may have a plurality of PDN connections managed by different PDN GWs.

For instance, assume in the network configuration of FIG. 2 that the UE 200 has a PDN connection with a certain PDN GW 207 to access the Internet 213, and further has a PDN connection with another PDN GW to access a corporate network of a user. In the state where a plurality of PDN connections exist to different PDN GWs, instead of using detach procedure, the SGSN 216 uses a deactivate bearer message to offload the UE 200 to another PDN GW when offloading from the PDN GW 207 to the GGSN 220 is triggered. The deactivate bearer message includes a cause value to instruct the UE 200 to reactivate bearer. When activation procedure is executed, the SGSN 216 selects the GGSN 220 to offload the UE 200.

Figure 1:
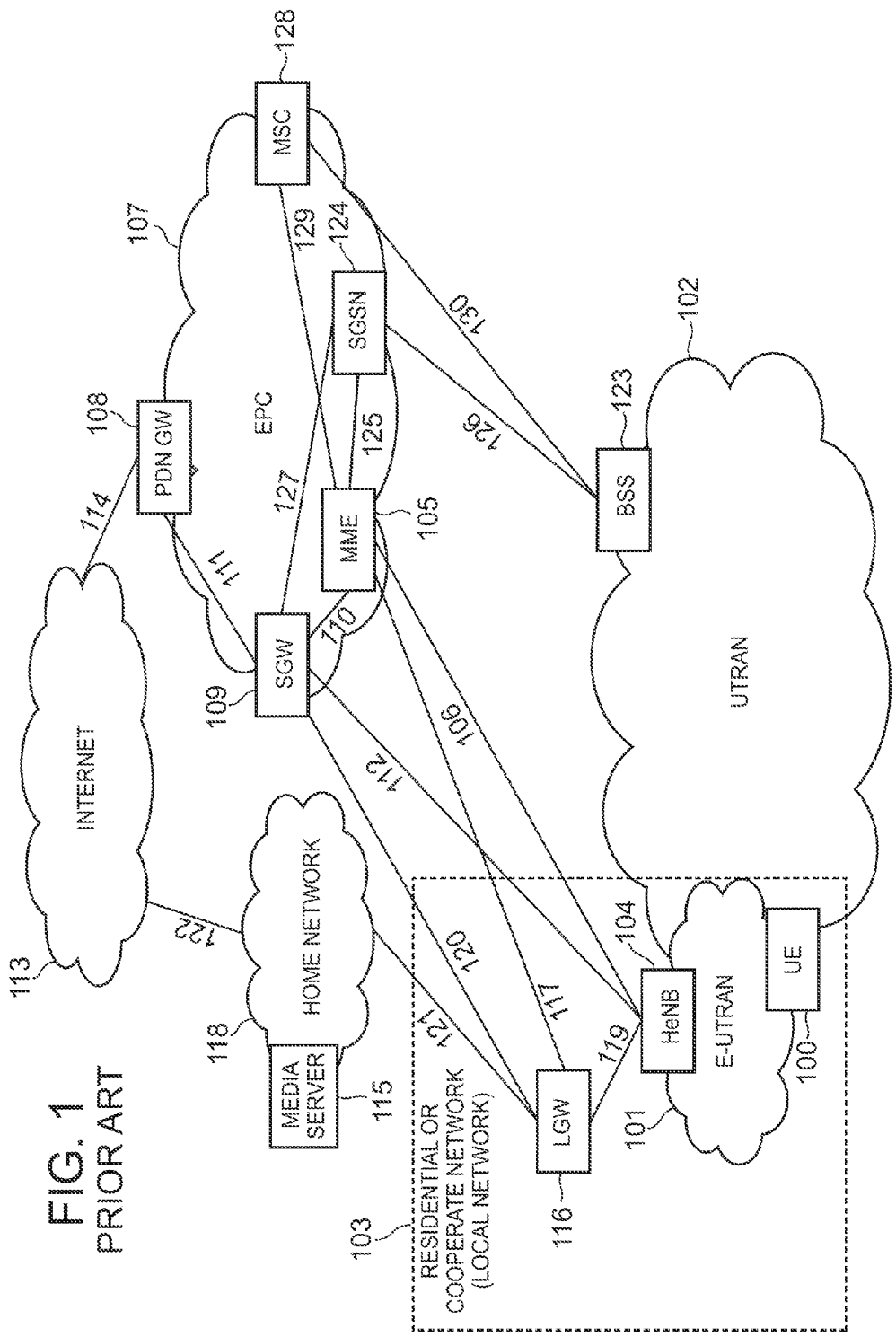
FIG. 1 shows an exemplary network system relating to the conventional technique and embodiments of the present invention.

Alternatively, assume in the network configuration of FIG. 1 that the UE 100 has a PDN connection with a certain PDN GW 108 to access the Internet 113, and further has a PDN connection with another PDN GW to access a corporate network of a user. In such a state where a plurality of PDN connections exist to different PDN GWs, instead of using detach procedure, the MME 105 uses a deactivate bearer message to offload the UE 100 to another PDN GW when offloading from the PDN GW 108 to the LGW 116 is triggered. The deactivate bearer message includes a cause value to instruct the UE 100 to reactivate bearer. When activation procedure is executed, the MME 105 selects the LGW 116 to offload the UE 100.

<Third Derived Example where a Set of Conditions is Provided to a UE after Receiving a CS Call>

In the above first and second embodiments, a set of conditions may be provided to a UE when the UE receives a CS call. For instance, the above first embodiment assumes that a set of conditions to keep a PS session of the UE 100 is transmitted from the LGW 116 when the UE 100 establishes a PDN connection to the LGW 116. However, after the UE 100 is handed over to the UTRAN 102 and receives a CS call, the LGW 116 may transmit the set of conditions to the UE 100. For instance, the LGW 116 passes a set of conditions with a time stamp attached to the MME 105. This set of conditions may include, but not limited to, duration when the LGW 116 performs buffering of a packet of the UE 100. Assume herein that a target RAT (i.e., the UTRAN 102) does not support a PS service. When the MME 105 finds that the UE 100 exists in the UTRAN 102, the MME 105 passes the set of conditions and the time stamp to the SGSN 124, and a notification message is transmitted from the SGSN 124 to the UE 100. This notification message includes a new information element to transmit the set of conditions and the time stamp received from the LGW 116 to the UE 100. When the CS call is completed, the UE 100 checks whether the set of conditions is still valid or not. For instance, when the set of conditions includes duration when the LGW 116 performs buffering of a packet of a SIPTO connection of the UE 100, the UE 100 can compare the current time of the UE 100 with the time stamp transmitted from the LGW 116, thereby calculating a time difference therebetween. The UE 100 compares this time difference with duration described in the set of conditions. When this time difference is shorter than the duration described in the set of conditions, the UE 100 selects to return to the residential or cooperate network 103 to resume a PDN connection with the LGW 116 and acquires the buffered packet.

As a further derived example, when the target RAT (i.e., the UTRAN 102) does not support a PS service, the MME 105 may pass a set of conditions and a time stamp to the MSC 128, and a notification message may be transmitted from the MSC 128 to the UE 100. This notification message includes a new information element to transmit the set of conditions and the time stamp received from the LGW 116 to the UE 100. When the CS call is completed, the UE 100 checks whether the set of conditions is still valid or not. For instance, when the set of conditions includes duration when the LGW 116 performs buffering of a packet of a SIPTO connection of the UE 100, the UE 100 can compare the current time of the UE 100 with the time stamp transmitted from the LGW 116, thereby calculating a time difference therebetween. The UE 100 compares this time difference with duration described in the set of conditions. When this time difference is shorter than the duration described in the set of conditions, the UE 100 selects to return to the residential or cooperate network 103 to resume a PDN connection with the LGW 116 and acquires the buffered packet.

In this way, even after the UE 100 is handed over to another access network due to a CS call (i.e., to execute or receive a CS call), the continuing of a currently-progressing PS session of the UE in a certain network is permitted, thereby fulfilling the object of the present invention. This means that, after completion of the CS call by the user, the PS session performed before the CS call (e.g., downloading of a file from a server) can be resumed. The UE determines based on the conditions provided by the network whether the PS session can be resumed or not. There is another advantage effect of supporting the maintenance of a PS session of the UE simply by extending signaling currently used for CSFB.

<Fourth Derived Example where a Set of Conditions is Transmitted Using a Handover Command>

The aforementioned first and second embodiments assume that, when the UE establishes a PDN connection, a set of conditions to keep a PS session of the UE is transmitted from the PDN GW or the LGW. Instead, during a handover of the UE to a CS capable domain, the PDN GW or the LGW may transmit a set of conditions to the UE. For instance, when a handover command message is transmitted, the set of conditions to be transmitted to the UE may be passed to the eNB or the HeNB. As a method of passing the set of conditions to the eNB or the HeNB, an implementation specific message may be used, for example. Alternatively, the PDN GW or the LGW may use a create session acknowledgement message, for example, to pass the set of conditions to the MME via the SGW. The MME uses a S1AP message (e.g., S1-AP UE context change request) to pass the set of conditions to the eNB or the HeNB.

For instance, in the network configuration of FIG. 1, when the UE 100 establishes a LIPA PDN connection with the LGW 116, the LGW 116 informs the HeNB 104 of a set of conditions on the LIPA PDN connection of the UE 100 (via the MME 105). When the HeNB 104 finds that the UE 100 has to be handed over by CSFB, the HeNB 104 inserts a set of conditions into a handover command message (transmitted at Step S406) to the UE 100. The UE 100 extracts the set of conditions from the handover command message, and uses the same to determine whether the UE 100 can resume a LIPA PS session or not after the CS call.

Alternatively, for instance, in the network configuration of FIG. 2, when the UE 200 establishes a PDN connection with the PDN GW 207, the PDN GW 207 informs the eNB 203 of a set of conditions on the PDN connection of the UE 200 (via the SGW 209 and the MME 204). When the eNB 203 finds that the UE 200 has to be handed over by CSFB, the eNB 203 inserts a set of conditions into a handover command message (transmitted at Step S908) to the UE 200. The UE 200 extracts the set of conditions from the handover command message, and uses the same to determine whether the UE 200 can resume a PS session or not after the CS call.

In this way, even after the UE is handed over to another access network due to a CS call (i.e., to execute or receive a CS call), the continuing of a currently-progressing PS session of the UE in a certain network is permitted, thereby fulfilling the object of the present invention. This means that, after completion of the CS call by the user, the PS session performed before the CS call (e.g., downloading of a media file from a home server) can be resumed. The UE determines based on the conditions provided by the network whether the PS session can be resumed or not. There is another advantage effect of eliminating the necessity of transmitting a set of conditions on all PDN connections set up by the UE to the UE.

<Fifth Derived Example where eNB/HeNB Performs Buffering>

The aforementioned first and second embodiments assume that buffering of PS traffic of the UE is performed by PDN GW or the LGW and the PDN GW or the LGW transmits a set of conditions to keep the PS session of the UE to the UE. Alternatively, the buffering of the PS session of the UE may be executed by the eNB or the HeNB. This is effective when the PDN GW or the LGW is legacy than the present invention (a device that does not support a function according to the present invention), whereas the eNB or the HeNB has to be extended so as to resume a PS session. In order to implement this, when the UE is handed over to another access network by CSFB, the eNB or the HeNB operates as a proxy of the UE. The PDN GW or the LGW continues to transmit PS traffic to the eNB or the HeNB, and the eNB or the HeNB performs buffering during predetermined duration.

For instance, in the network configuration of FIG. 1, the HeNB 104 finds that the UE 100 has a LIPA PDN connection with the LGW 116. At the time of a handover of the UE 100 by CSFB, the HeNB 104 inserts a set of conditions into a handover command message (transmitted at Step S406) to the UE 100. Herein, the HeNB 104 does not transmit, to the MME 105, a S1AP release message to delete a LIPA PS context. The LGW 116 continues to transmit LIPA PS traffic to the HeNB 104, and the HeNB 104 starts buffering of the LIPA PS traffic of the UE 100 only for predetermined duration indicated by the set of conditions. The UE 100 extracts the set of conditions from the handover command message, and uses the same to determine whether the UE 100 can resume a LIPA PS session or not after the CS call.

At the same time, the HeNB 104 may insert additional information into the handover command message to the UE 100 so as to allow the UE 100 to easily resume the connection when a CS call is completed. For instance, the additional information inserted may include a specific identifier to allow the HeNB 104 to identify the UE 100 when the UE 100 returns a connection to the E-UTRAN after a CS call, a security key material, a perfect protection key, a radio bearer ID mapping or the like that allow the UE 100 and the HeNB 104 to reestablish encryption and the like. When the UE 100 leaves the HeNB 104 and executes a CS session, the HeNB 104 operates as if the UE 100 still existed in the communication area expect for not transmitting a reception packet to the radio bearer and instead performing buffering. After completion of the CS call, the UE 100 returns to a direct connection to the HeNB 104, and uses information provided from the HeNB 104 in the handover command to reestablish a necessary radio bearer. Then, the HeNB 104 transfers the buffered packet via a corresponding radio bearer to the UE 100, whereby a LIPA/SIPTO PS session can be resumed.

Alternatively for instance, in the network configuration of FIG. 2, the eNB 203 finds that the UE 200 has a PDN connection with the PDN GW 207. At the time of a handover of the UE 200 by CSFB, the eNB 203 inserts a set of conditions into a handover command message (transmitted at Step S0908) to the UE 200. Herein, the eNB 203 does not transmit, to the MME 204, a S1AP message to delete a PS context of the UE 200. The PDN GW 207 continues to transmit PS traffic to the eNB 203, and the eNB 203 starts buffering of the PS traffic of the UE 200 only for predetermined duration indicated by the set of conditions. The UE 200 extracts the set of conditions from the handover command message, and uses the same to determine whether the UE 200 can resume a PS session or not after the CS call.

In this way, even after the UE 100 is handed over to another access network due to a CS call (i.e., to execute or receive a CS call), the continuing of a currently-progressing PS session of the UE in a certain network is permitted, thereby fulfilling the object of the present invention. This means that, after completion of the CS call by the user, the PS session performed before the CS call (e.g., downloading of a media file from a home server) can be resumed. The UE determines based on the conditions provided by the network whether the PS session can be resumed or not. There is another advantage effect that the PDN GW or the LGW may be legacy than the present invention.

<Sixth Derived Example where Target RAT does not Support PS Service>

The aforementioned first and second embodiments assume that at the time of a handover of the UE by CSFB, the target RAT supports a PS service. However, in the case where the target RAT is GREAN, for example, the target RAT may not support a PS service. In this way, even when the target RAT does not support a PS service, the solution of the present invention to keep a PS session of the UE is applicable.

When the target RAT does not support a PS service, since a PS session of the UE is terminated, a SGSN is not involved in inter RAT handover procedure. Herein, the HeNB or the eNB transmits a RRC connection release message instead of a handover command message to move the UE to the target RAT. The RRC connection release message is a notification to inform to what RAT the UE is to be moved. Similarly, the UE does not transmit a handover completion message, and instead transmits a routing area update (RAU) message or a location area update (LAU) message.

For instance, referring to FIG. 4, the SGSN 124 in this example is not involved in the inter RAT handover procedure at Step S405. When the HeNB 104 knows that the UTRAN 102 cannot support a PS service, the HeNB 104 transmits a RRC connection release message to the UE 100. The RRC connection release message includes a notification informing the UE 100 to select the UTRAN 102. The UE 100 uses information in the RRC connection release message to select the UTRAN 102. Similarly, when the HeNB 104 and the UE 100 find that the handover is based on CSFB, both of the HeNB 104 and the UE 100 keep a context of a LIPA PS session of the UE 100. Thereby, the UE 100 can resume the LIPA PS session when returning to the E-UTRAN 101 after a CS call.

Alternatively, for instance, referring to FIG. 9, the SGSN 216 in this example is not involved in the inter RAT handover procedure at Step S907. When the eNB 203 knows that the UTRAN 202 cannot support a PS service, the eNB 203 transmits a RRC connection release message to the UE 200. The RRC connection release message includes a notification informing the UE 200 to select the UTRAN 202. The UE 200 uses information in the RRC connection release message to select the UTRAN 202. Similarly, when the eNB 203 and the UE 200 find that the handover is based on CSFB, both of the eNB 203 and the UE 200 keep a context of a PS session of the UE 200. Thereby, the UE 200 can resume the PS session when returning to the E-UTRAN 201 after a CS call.

In another derived example, in FIG. 1, when the UE 100 establishes a LIPA PDN connection with the LGW 116, the LGW 116 informs the HeNB 104 of a set of conditions on the LIPA PDN connection of the UE 100. When the HeNB 104 finds that the UTRAN 102 does not support a PS service and the UE 100 has to be handed over by CSFB, the HeNB 104 inserts a set of conditions into a RRC connection release message to be transmitted to the UE 100. The UE 100 extracts the set of conditions from the RRC connection release message, and uses the same to determine whether the UE 100 can resume a LIPA PS session after the CS call.

In still another derived example, referring to FIG. 2, when the UE 200 establishes a PDN connection with the PDN GW 207, the PDN GW 207 informs the eNB 203 of a set of conditions on the PDN connection of the UE 200 (via the SGW 209 and the MME 204). When the eNB 203 finds that the UTRAN 202 does not support a PS service and the UE 200 has to be handed over by CSFB, the eNB 203 inserts a set of conditions into a RRC connection release message to be transmitted to the UE 200. The UE 200 extracts the set of conditions from the RRC connection release message, and uses the same to determine whether the UE 200 can resume a PS session after the CS call.

<Seventh Derived Example where, when Returning to a Network Before CS Call, Determination is Made as to Whether or not to Trigger SIPTO>

In the aforementioned embodiments, whether or not trigger SIPTO can be determined drastically when the UE returns to the network before a CS call. In the above description, for instance in FIG. 1, assume that when a selection is made to make the UE 100 return to the residential or cooperate network 103 after a CS call, the MME 105 triggers SIPTO to reselect the LGW 116 relating to the UE 100. The reason whey the MME 105 selects the LGW 116 is because the cellular operator has simple policy of always executing SIPTO on all UEs to optimize the resource at the EPC 107. That is, this means that the policy is static. Instead, the policy may be made drastic so that the MME 105 determines whether or not to trigger SIPTO based on the resource usage at the EPC 107. In this case, for instance, when the UE 100 selects to return to the residential or cooperate network 103 after a CS call, the MME 105 may decide not to execute SIPTO and make the UE 100 connect to the PDN GW 108. At this time, since the PDN GW 108 does not have a previous context of a PDN connection of the UE 100, the PDN GW 108 assigns a new PDN connection to the UE 100 using a new IP address. When the UE 100 finds that the set of conditions provided from the LGW 116 is still valid and the UE 100 does not acquire the previous IP address, the UE 100 estimates that SIPTO is not triggered and is connected to another PDN GW.

The LGW 116, however, will continue buffering of a packet of the UE 100 until the set of conditions becomes invalid. Therefore, it is effective that the UE 100 informs the LGW 116 that the UE 100 connects to another PDN GIN and requests to clear the buffering relating to the UE 100. Such a notification to the LOW 116 can be performed via the HeNB 104. The UE 100 may inform the MME 105 that connection to the LOW 116 is desirable during a PDN connection request to the MME 105. As a result, the MME 105 selects the LGW 116 for the UE 100 if possible.

<Eighth Derived Example Relating to a Set of Conditions>

The above embodiments describe the case where the set of conditions include duration when buffering of PS traffic of a UE is possible, and further include a notification of a handover of a PDN connection of a UE to a target access. The set of conditions, however, may include other conditions and parameters. For instance, the set of conditions may include a frequency that the UE has to adjust to resume PS traffic of the UE after a CS call.

For instance, the set of conditions received by the UE 100 includes duration when the LGW 116 performs buffering of a LIPA PS session of the UE 100, and further includes a frequency of cell (E-UTRAN 101). After a CS call, the UE 100 uses the duration indicated in the set of conditions, and determines whether the UE 100 can resume the LIPA PS session or not. Then, if the session can be resumed, the UE 100 uses the frequency indicated in the set of conditions as a reference to make a selection to return to the cell (E-UTRAN 101) managed by the HeNB 104 so as to resume the LIPA session.

<Ninth Derived Example where a UE Negotiates with HeNB about Buffering Duration>

The duration indicated in the set of conditions can be decided by a network based on capability (e.g., data storage capacity) of the network. However, a negotiation may be performed about this duration between a UE and the network. Such a negotiation leads to an advantageous effect of enabling dynamic setting of duration suitable for a type of a CS call that the UE originates or receives. For instance, when the UE 100 finds that switching to a CS capable domain is just for transmission of a short message (SMS), the UE 100 informs the LGW 116 that duration necessary for buffering of LIPA PS traffic of the UE 100 is short. In this case, the UE 100 returns to the E-UTRAN 101 immediately after the completion of SMS transmission, and continues LIPA. PS traffic.

<Tenth Derived Example Relating to Buffering Entity>

A buffering entity keeps the IP address of the UE so as to allow the UE to resume a PS session. This buffering entity may be implemented using a PDN GW, a LGW, an eNB, a HeNB or the like, for example. The buffering entity may keep another type of context (e.g., a connection state of the UE). For instance, when the LGW 116 doubles as a network address translation (NAT) device of the residential or cooperate network 103, the LGW 116 can keep the state of NAT relating to the UE 100. Thereby, when the UE 100 tries to resume a PS session with the LGW 116, there is no need to reconfigure the NAT state. In another example, the LGW 116 may be a HTTP proxy of the UE 100. In this case, the LGW 116 may keep the configuration of the UE 100 relating to the HTTP proxy.

<Eleventh Derived Example where Buffering Duration is Displayed to User>

Although the aforementioned first and second embodiments assume that a UE only considers duration indicated in the set of conditions, this duration may be informed to a user. For instance, buffering duration of PS session may be displayed to a user using a graphical user interface (GUI) of the UE. Thereby, the user can find the duration of making a CS call without affecting the PS session. For instance, when the UE 100 acquires a handover command from the HeNB 104, in order to let the user know how long a LIPA PS session is buffered, the UE 100 displays the duration indicated in the set of conditions to the user. Then, the user can consider this information when originating or answering a CS call. If the user feels that the buffering duration is too short, the user may negotiate with a buffering entity to extend the buffering duration or may use an application to temporarily interrupt the PS traffic (i.e., stopping reproduction of streaming video).

<Twelfth Derived Example of where UE Receives Page Message>

The aforementioned first and second embodiments assume that a UE has a progressing data communication and a network transmits a CS service notification to the UE. The UE checks a set of conditions when receiving the CS service notification or accepting a CS call. However, the UE may not have a progressing data communication or the network may transmit a page message instead of the CS service notification. The UE receives the page message and checks a set of conditions when accepting a CS call.

<Thirteenth Derived Example Applied to M2M Applications>

The present invention is applicable to a machine-to-machine type communication (M2M) scenario. For instance, assume that a machine type communication (MTC) device exists at a PS capable domain and receives a page requesting switching to a CS domain and receiving a SMS (SMS arrival page) during downloading of packet data from a MTC server. In such a case, according to the present invention, when the MTC device performs a handover to the CS capable domain to acquire the SMS, a buffering entity can perform buffering of a data packet from the MTC server to the MTC device. When the MTC device completes the acquisition of the SMS, the MTC device determines whether a data communication with the MTC server can be resumed or not based on the set of conditions provided from the buffering entity. If a data communication can be resumed, the MTC device returns to the PS capable domain to resume a data communication with the MTC server.

<Exemplary Functional Architecture of UE>

Figure 16:
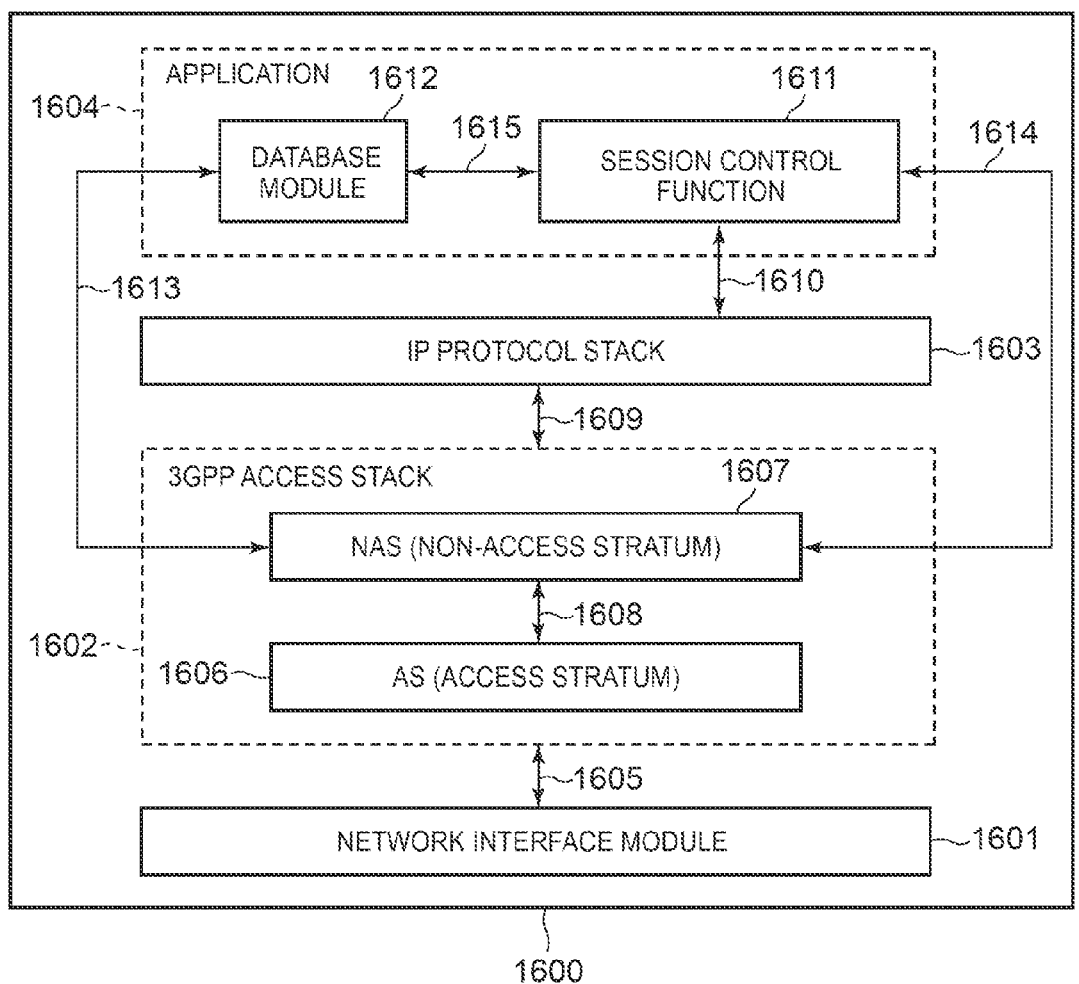
FIG. 16 is a block diagram showing a preferable functional architecture to implement the present invention.

FIG. 16 is a block diagram showing a preferable example of functional architecture to implement the present invention. FIG. 16 shows a functional architecture 1600 including a network interface module 1601, a 3GPP access stack 1602, an IP protocol stack 1603 and an application 1604. Herein, a preferable device having the functional architecture shown in FIG. 16 may be, but not limited to, a mobile communication device such as a mobile phone or a laptop. A preferable device having the functional architecture shown in FIG. 16 corresponds to the aforementioned UE 100 or UE 200.

The network interface module 1601 is a functional block indicating all hardware and software required to let the device perform a communication with another node via a communication medium. Using terms known in the related technical field, the network interface module 1601 may represent a communication component such as layer 1 (physical layer) and layer 2 (data link layer), firmware, a driver and a communication protocol. It is obvious for a person skilled in the art that the functional architecture 1600 may include one or more network interface modules 1601. Via a signal/data path 1605, the network interface module 1601 can transmit a trigger/packet to the 3GPP access stack 1602. For instance, the network interface module 1601 transfers a received NAS message (e.g., a PDN accept message) to the 3GPP access stack 1602 for further processing. Via the signal/data path 1605, the 3GPP access stack 1602 may pass, to the network interface module 1601, a NAS message (e.g., a PDN connection message) to be transmitted to a network for transmission.

The 3GPP access stack 1602 is a functional block to manage a communication between the device and a network via a 3GPP radio access network. The 3GPP access stack 1602 has two functions of an access stratum 1606 and a non-access stratum 1607.

The access stratum 1606 manages a radio bearer for this preferable device. For instance, the access stratum 1606 executes RRC connection signaling to construct a radio bearer to enable the device to transmit/receive a data packet. The non-access stratum 1607 performs processing relating to mobility and a session when the device is connected to a 3GPP radio access network. A signal/data path 1608 between the access stratum 1606 and the non-access stratum 1607 enables mutual transmission of a trigger/packet. For instance, when the device has to select a radio cell, the non-access stratum 1607 provides a selected radio cell identifier to the access stratum 1606.

The IP protocol stack 1603 is a functional block having software to implement an Internet protocol to let the device perform a communication with another node on the global Internet via a cellular network. The IP protocol stack 1603 may have, but not limited to, IPv4 or IPv6, for example. Via a signal/data path 1609, the IP protocol stack 1603 can transmit a trigger/packet to the 3GPP access stack 1602. For instance, the 3GPP access stack 1602 can pass an IP address for a communication at the 3GPP radio access network to the IP protocol stack 1603. Via a signal/data path 1610, the IP protocol stack 1603 can pass IP address information to a session control function 1611.

The application 1604 represents a functional block indicating all protocols and programs located at upper positions than a network layer in a communication protocol stack. This includes a transport protocol or a session layer protocol such as a transmission control protocol (TCP), a stream control transport protocol (SCTP) or a user datagram protocol (UDP) or programs and software necessary for a communication with another node. The application 1604 further has the session control function 1611 and a database module 1612. The database module 1612 provides a function to store information that the device requires. Exemplary information to be stored in the database module 1612 may be, but not limited to, a set of conditions provided from the PDN GW, the LGW, the eNB or the HeNB. Via a signal/data path 1613, the non-access stratum 1607 can pass a set of conditions provided by PCO to the database module 1612 for storage.

The present invention further introduces the session control function 1611. This session control function 1611 determines whether the device has to return to the original access network to continue a PS session after a CS call. When receiving a trigger of a pending CS call relating to the device, the non-access stratum 1607 informs the session control function 1611 of this trigger (event). This notification is enabled by a signal/data path 1614. The session control function 1611 fetches a set of conditions provided for a PS session of the device from the database module 1612. This searching is enabled by a signal/data path 1615. A current radio cell identifier to which the device is connected also is searched by the database module 1612. When there is a set of conditions on a PS session of the device, the session control function 1611 requests the non-access stratum 1607 to make a notification to the session control function 1611 when a CS call is completed. The non-access stratum 1607 can find that the device enters an idle mode (i.e., completion of a CS call). Further, the session control function 1611 has a timer function to monitor a time when the device receives a CS call to measure a time of the CS call.

When the device enters an idle mode after completion of the CS call, the non-access stratum 1607 informs the session control function 1611 of this event (entering an idle mode). The session control function 1611 performs processing of checking whether the time of CS call performed by the device is shorter than duration (i.e., buffering time of a packet in a network) specified by the set of conditions. When the time of the CS call is shorter than the buffering time, the session control function 1611 informs the non-access stratum 1607 to select a radio cell to which the device connected before the CS call. At this time, the session control function 1611 can provide an identifier of the radio cell (searched from the database module 1612) and other additional information to the non-access stratum 1607. The non-access stratum 1607 provides the selected radio cell identifier to the access stratum 1606, whereby selected procedure is executed.

The present specification provides practical and preferable embodiments of the present invention, and the present invention can be modified for the design and the parameters without departing from the scope of the present invention. For instance, the present specification provides specific numbers, the number of times, structures, protocol names and other parameters in detail for understanding of the present invention, all of which are just an example.

For instance, the aforementioned embodiments assume that a trigger is acquired from a network for an incoming CS call of a user. The present invention, however, is applicable to the case where a user decides to perform a CS call as well. In this case, the trigger will be issued from the user. The aforementioned embodiments assume that a trigger to hand over a UE to a different access network is based on a CS call. The present invention, however, is applicable to the case a network requests a UE to execute frequent scanning and reporting. In this case, the trigger according to the present invention is not a CS call but a network command.

The aforementioned embodiments describe the case where a UE executes a handover from an E-UTRAN cell to a UTRAN cell. The present invention, however, is applicable to the case where a UE executes a handover from an E-UTRAN cell to a GREAN cell as well. The scenario described in the aforementioned embodiments relates to 3GPP architecture. The solution of the present invention described in the present specification, however, is applicable to a technique of arranging different types of access networks, a technique of limiting the use of access technique types for a certain mobility management mechanism, and the like.

Each functional block used in the description of the above-stated embodiments may be typically implemented as a LSI (Large Scale Integration) that is an integrated circuit. These blocks may be individually configured as one chip, or one chip may include a part or all of the functional blocks. LSIs may be called an IC (Integrated Circuit), a system LSI, a super LSI, and an ultra LSI depending on the degree of integration.

A technique for integrated circuit is not limited to a LSI, but an integrated circuit may be achieved using a dedicated circuit or a general-purpose processor. A FPGA (Field Programmable Gate Array) capable of programming after manufacturing a LSI and a reconfigurable processor capable of reconfiguring connection and setting of a circuit cell inside a LSI may be used.

Further, if a technique for integrated circuit that replaces LSIs becomes available with the development of a semiconductor technique or derived techniques, functional blocks may be naturally integrated using such a technique. For instance, biotechnology may be applied thereto.

INDUSTRIAL APPLICABILITY

The present invention has an advantageous effect of allowing a communication terminal, even after a handover between different types of networks, to determine whether a communication that was in progress in the access network connected before the handover can be resumed or not, and is applicable to a communication technique in a packet switching data communication network, particularly to a packet data communication technique for a handover between different access networks.

The invention claimed is:

1. A communication terminal connectable to a network including a first network and a second network, the first network supporting a first communication technique but not a second communication technique, the second network supporting the second communication technique, the communication terminal comprising:
 a first communication unit that connects to the first network and performs a communication by the first communication technique;

a second communication trigger acquisition unit that, during a communication by the first communication technique, acquires a trigger to start a communication by the second communication technique;

a second communication unit that switches a connection from the first network to the second network in response to the trigger and starts a communication by the second communication technique;

a condition acquisition unit that acquires a predetermined communication resumption condition from the network before the communication by the second communication technique started in response to the trigger is completed; and a resumption determination unit that determines on a basis of the predetermined communication resumption condition whether a communication by the first communication technique from a time when the connection is switched from the first network to the second network can be resumed or not after completion of the communication by the second communication technique.

2. The communication terminal according to claim 1, wherein the first communication technique is a packet switching communication, the second communication technique is a circuit switching communication, and the trigger is call reception or call origination in the circuit switching communication.

3. The communication terminal according to claim 1, wherein the second communication trigger acquisition unit acquires the trigger from the network, and acquires, from the network, an instruction for connection switching from the first network to the second network.

4. The communication terminal according to claim 1, wherein after the second communication unit switches the connection from the first network to the second network, the condition acquisition unit acquires the predetermined communication resumption condition from the second network.

5. The communication terminal according to claim 1, wherein the condition acquisition unit acquires, via the first network, the predetermined communication resumption condition together with an instruction for connection switching from the first network to the second network.

6. The communication terminal according to claim 1, wherein the condition acquisition unit acquires the predetermined communication resumption condition when establishing a connection to perform a communication by the first communication technique.

7. The communication terminal according to claim 1, wherein the predetermined communication resumption condition includes information indicating that information to be transmitted to the communication terminal in the communication by the first communication technique after a time when the connection is switched from the first network to the second network is to be buffered in the first network.

8. The communication terminal according to claim 1, wherein the predetermined communication resumption condition includes buffering duration in which information to be transmitted to the communication terminal in the communication by the first communication technique after a time when the connection is switched from the first network to the second network is to be buffered in the first network.

9. The communication terminal according to claim 8, further comprising:

a timer unit that measures a time from switching of the connection from the first network to the second network to completion of the communication by the second communication technique, wherein the resumption determination unit compares the buffering duration with a measurement result by the timer unit to determine whether or not the communication terminal can return to the first network and resume a communication by the first communication technique.

10. The communication terminal according to claim 1, wherein the predetermined communication resumption condition includes information indicating whether or not a connection of the first communication unit to the second network leads to resumption of a communication by the first communication technique that was performed at the first network via the second network.

11. The communication terminal according to claim 1, wherein the resumption determination unit determines whether a communication by the first communication technique via the first network can be resumed or not by returning the connection to the first network after completion of a communication by the second communication technique, and the first communication unit connects to the first network and requests the first network to resume the communication by the first communication technique when the communication by the first communication technique via the first network can be resumed.

12. The communication terminal according to claim 11, wherein the first communication unit informs the first network of an address used for the communication by the first communication technique before switching of the connection to the second network, when the first communication unit connects to the first network and requests the first network to resume the communication by the first communication technique.

13. The communication terminal according to claim 1, wherein the resumption determination unit determines whether a communication by the first communication technique via the second network can be resumed or not after completion of the communication by the second communication technique.

14. A network node, in a network including a first network and a second network, the first network supporting a first communication technique but not a second communication technique, the second network supporting the second communication technique, the network node residing in the first network and comprising:

a communication resumption condition provision unit that provides a predetermined communication resumption condition to a communication terminal connecting to the first network and performing a communication by the first communication technique, wherein when the communication terminal performing a communication by the first communication technique acquires a trigger to start a communication by the second communication technique and switches a connection from the first network to the second network in response to the trigger to start a communication by the second communication technique, the predetermined communication resumption condition includes information indicating whether the communication terminal can resume a communication by the first communication technique from a time when the connection is switched from the first network to the second network after completion of the communication by the second communication technique.

15. The network node according to claim 14, wherein the predetermined communication resumption condition includes information indicating that information to be transmitted to the communication terminal in the communication by the first communication technique after a time when the communication terminal switches the connection from the first network to the second network is to be buffered in the first network.

16. The network node according to claim 14, wherein the predetermined communication resumption condition includes buffering duration in which information to be transmitted to the communication terminal in the communication by the first communication technique after a time when the connection is switched from the first network to the second network is to be buffered in the first network.

17. The network node according to claim 16, further comprising a buffer that performs buffering, when the communication terminal switches a connection from the first network to the second network, information to be transmitted to the communication terminal in a communication by the first communication technique after a time when the communication terminal switches a connection from the first network to the second network for the buffering duration.

18. The network node according to claim 17, further comprising an information transfer unit that, when the communication terminal returns the connection to the first network during the buffering duration and a request to resume a communication by the first communication technique transmitted from the communication terminal is detected, transfers information stored in the buffer to the communication terminal.

* * * * *